(12) United States Patent
Dhiman et al.

(10) Patent No.: US 10,638,052 B2
(45) Date of Patent: Apr. 28, 2020

(54) METHOD AND APPARATUS FOR GENERATING HDR IMAGES

(71) Applicant: Samsung Electronics Co., Ltd., Suwon-si, Gyeonggi-do (KR)

(72) Inventors: Ankit Dhiman, Himachal Pradesh (IN); Jayakrishna Alapati, Bangalore (IN); Sankaranarayanan Parameswaran, Bangalore (IN); Lokesh Rayasandra Boregowda, Bengaluru (IN); Eun-sun Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

(21) Appl. No.: 15/951,555

(22) Filed: Apr. 12, 2018

(65) Prior Publication Data
US 2018/0302544 A1    Oct. 18, 2018

(30) Foreign Application Priority Data

Apr. 12, 2017  (IN) .............................. 201741013144
Mar. 6, 2018   (IN) .............................. 201741013144

(51) Int. Cl.
*H04N 5/235* (2006.01)
*H04N 5/232* (2006.01)
(Continued)

(52) U.S. Cl.
CPC ........... *H04N 5/2353* (2013.01); *G06T 5/009* (2013.01); *G06T 5/50* (2013.01); *G06T 7/246* (2017.01);
(Continued)

(58) Field of Classification Search
CPC ............. H04N 5/2353; H04N 5/23254; H04N 5/3572; H04N 5/243; H04N 5/2356;
(Continued)

(56) References Cited

U.S. PATENT DOCUMENTS 8,699,822 B2   4/2014   Park et al.
8,908,055 B2   12/2014  Furumura et al.
(Continued)

FOREIGN PATENT DOCUMENTS

JP   2014230018 A    12/2014
KR   10-1000859 B1   12/2010
(Continued)

OTHER PUBLICATIONS

Samsung, "Gear 360 Specifications," http://www.samsung.com/global/galaxy/gear-360/specs/, retrieved Apr. 12, 2018.

*Primary Examiner* — Timothy J Henn
(74) *Attorney, Agent, or Firm* — Jefferson IP Law, LLP

(57) ABSTRACT

A method for generating a high-dynamic-range (HDR) image using an imaging device is provided. The method includes capturing a long-exposure (LE) image, a short-exposure (SE) image, and an auto-exposure (AE) image of a scene, estimating motion information in the SE image and the LE image based on a reference image which is determined based on an image statistics parameter, aligning the SE image and the LE image using the motion information, generating a pixel-weight coefficient for each of the SE image, the LE image, and the AE image, generating an overlapped region mask corresponding to an overlapped region in each of the SE image, the LE image and the LE image, determining a modified pixel-weight coefficient in the overlapped region mask and correcting a brightness difference, and generating an HDR image from the SE image, the LE image and the AE image using the modified at least one pixel-weight coefficient.

10 Claims, 23 Drawing Sheets

(51) Int. Cl.
- *H04N 5/243* (2006.01)
- *H04N 5/357* (2011.01)
- *G06T 7/246* (2017.01)
- *G06T 5/50* (2006.01)
- *G06T 5/00* (2006.01)

(52) U.S. Cl.
CPC ......... *H04N 5/2351* (2013.01); *H04N 5/2355* (2013.01); *H04N 5/2356* (2013.01); *H04N 5/23229* (2013.01); *H04N 5/23238* (2013.01); *H04N 5/23254* (2013.01); *H04N 5/243* (2013.01); *H04N 5/3572* (2013.01); *G06T 2207/10016* (2013.01); *G06T 2207/10144* (2013.01); *G06T 2207/20208* (2013.01); *G06T 2207/20221* (2013.01)

(58) Field of Classification Search
CPC ............. H04N 5/2355; H04N 5/23229; H04N 5/2351; H04N 5/23238; G06T 7/246; G06T 5/50; G06T 5/009; G06T 2207/20221; G06T 2207/20208; G06T 2207/10144; G06T 2207/10016
See application file for complete search history.

(56) References Cited

U.S. PATENT DOCUMENTS

| | | |
|---|---|---|
| 2010/0157078 A1 | 6/2010 | Atanassov et al. |
| 2011/0069200 A1* | 3/2011 | Oh .................. H04N 5/235 348/229.1 |
| 2012/0162366 A1 | 6/2012 | Ninan et al. |
| 2013/0229546 A1 | 9/2013 | Furumura et al. |
| 2014/0152694 A1 | 6/2014 | Narasimha et al. |
| 2014/0247985 A1* | 9/2014 | Park .................. G06T 5/40 382/170 |
| 2015/0341537 A1* | 11/2015 | Peng .................. H04N 5/2351 348/234 |
| 2016/0004570 A1* | 1/2016 | Koh .................. G06F 9/5044 718/104 |
| 2016/0037043 A1* | 2/2016 | Wang .................. H04N 5/2355 382/275 |
| 2016/0267333 A1* | 9/2016 | Jung .................. G06T 7/73 |
| 2017/0023492 A1* | 1/2017 | Olsson .................. G01N 21/954 |

FOREIGN PATENT DOCUMENTS

| | | |
|---|---|---|
| KR | 10-1616874 B1 | 5/2016 |
| WO | 2014/190051 A1 | 11/2014 |

\* cited by examiner

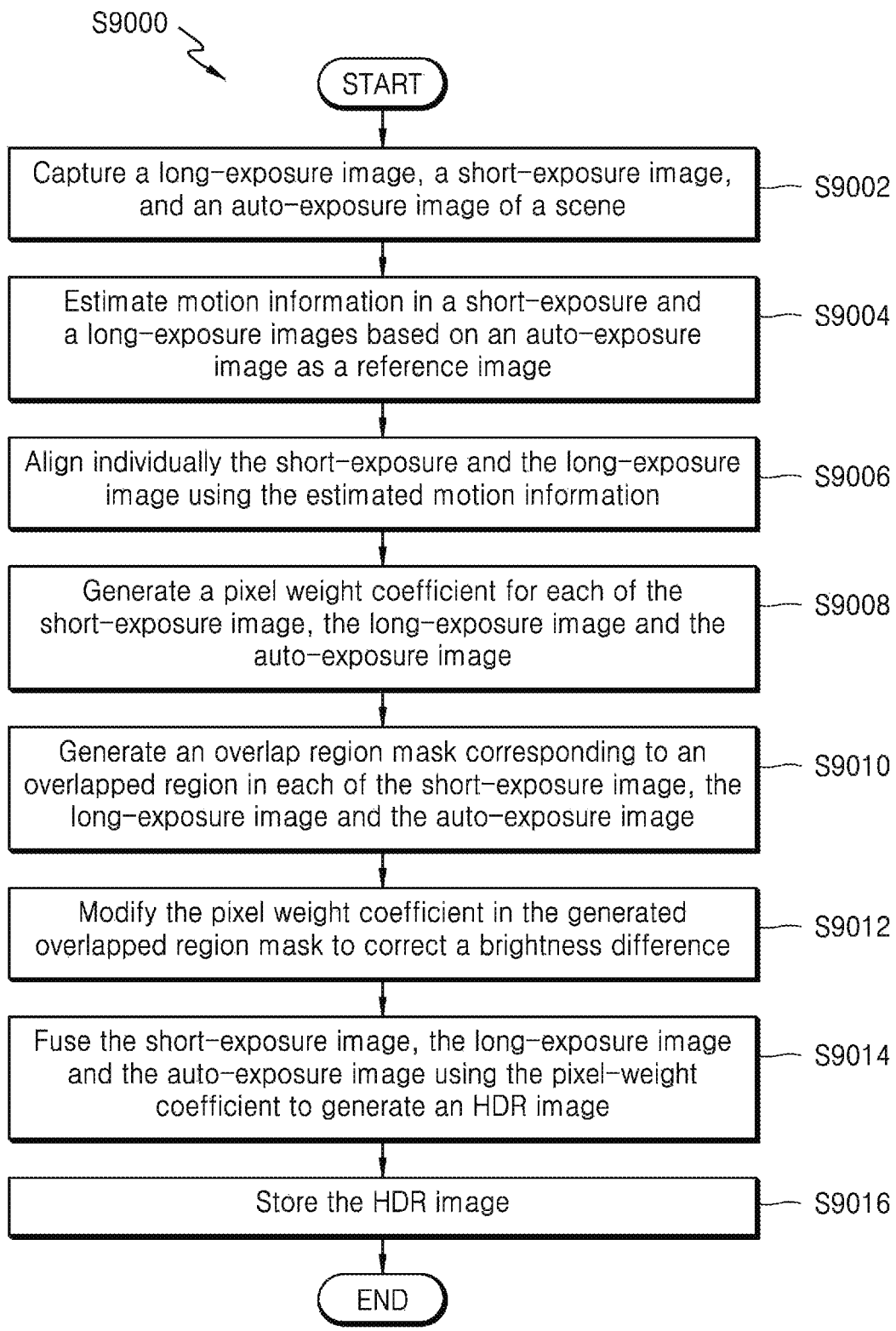

METHOD AND APPARATUS FOR GENERATING HDR IMAGES

CROSS-REFERENCE TO RELATED APPLICATION(S)

This application is based on and claims priority under 35 U.S.C. § 119(a) of an Indian provisional patent application number 201741013144, filed on Apr. 12, 2017, in the Indian Patent Office, and of an Indian patent application number 201741013144, filed on Mar. 6, 2018, in the Indian Patent Office, the disclosure of each of which is incorporated by reference herein in its entirety.

BACKGROUND

1. Field

The disclosure relates to a content processing system. More particularly, the disclosure relates to a method and apparatus for generating a high-dynamic-range (HDR) image of a scene.

2. Description of the Related Art

A fisheye lens is an ultra-wide-angle lens that produces a strong visual distortion intended to create a wide panoramic or hemispherical image of an exposed scene, called as a fisheye image. The fisheye lens utilizes a special mapping for projecting the exposed scene into a characteristic convex non-rectilinear appearance. An imaging device captures a high-dynamic-range (HDR) image including the fisheye images of a front scene and a rear scene.

Thus, it is desired to address the above mentioned disadvantages or other shortcomings or at least provide a useful alternative.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for generating a high-dynamic-range (HDR) image.

In accordance with an aspect of the disclosure, a method for generating an HDR image of a scene using an imaging device is provided. The method includes capturing a long-exposure (LE) image, a short-exposure (SE) image, and an auto-exposure (AE) image of the scene. Further, the method includes estimating motion information in the SE image and the LE image based on a reference image. The motion information include at least one of a translation and a rotation of the imaging device in undistorted regions of the AE image and the at least one of the SE image and the LE image. The reference image is determined based on an image statistics parameter. Further, the method includes aligning individually the SE image and the LE image using the estimated motion information. Further, the method includes generating a pixel weight coefficient for each of the SE image, the LE image and the AE image. Further, the method includes generating an overlap region mask corresponding to an overlap region in each of the SE image, the LE image and the AE image. Further, the method includes modifying the pixel weight coefficient in the generated overlapped region mask to correct a brightness difference. Further, the method includes fusing the SE image, the LE image and the AE image using the modified pixel-weight coefficient to generate the HDR image. Further, the method includes storing the HDR image.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9A is a flow diagram illustrating a method for generating an HDR image according to various embodiments of the disclosure;

Throughout the drawings, it should be noted that like reference numbers are used to depict the same or similar elements, features, and structures.

DETAILED DESCRIPTION

Figure 1:
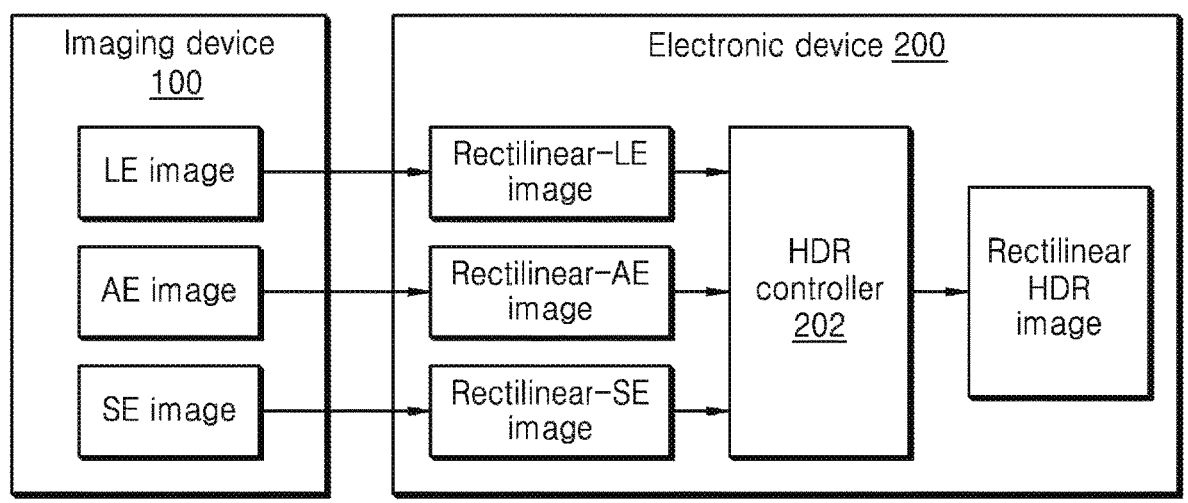
FIG. 1 illustrates an overview of a system for generating a rectilinear high-dynamic-range (HDR) image from exposure bracketed fisheye images according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It may be advantageous to set forth definitions of certain words and phrases used throughout this document. The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

In an embodiment, estimating the motion information in the short-exposure (SE) image and the long-exposure (LE) image based on the reference image includes detecting feature-points in undistorted regions of the reference image and at least one of the SE image and the LE image, and determining pairwise matches in the undistorted region based on the detected feature-points.

In an embodiment, the brightness difference is corrected by determining a distance between each pixel location from a center of the auto-exposure (AE) image, detecting whether the distance meets a threshold, and performing one of modulating a high-dynamic-range (HDR) weight of each of the SE image and the LE image in response to determining that the distance meets the threshold, and using a default weight of each of the SE image and the LE image and the AE image in response to determining that the distance does not meet the threshold.

In an embodiment, the HDR weight of each of the SE image and the LE image is modulated by suppressing weights of the LE image and the SE image and enhancing weights of the AE image based on at least one of a distance from a center of the AE image and pixel difference between a front view and a rear view.

In an embodiment, the imaging device is configured to capture the LE image, the SE image, and the AE image in an HDR mode.

In an embodiment, the HDR image is preferably a 360-degree (360-degree wide) image.

Accordingly, the various embodiments herein provide a method for generating an HDR image of a scene in an imaging device. The method includes capturing an LE image, an SE image, and an AE image of the scene. Further, the method includes estimating motion information in the SE image and the LE image based on a reference image. The reference image is determined based on an image statistics parameter. Further, the method includes aligning individually the SE image and the LE image using the estimated motion information. Further, the method includes generating a pixel weight coefficient for each of the SE image, the LE image and the AE image. Further, the method includes fusing the SE image, the LE image and the AE image using the pixel-weight coefficient to generate the 360-degree wide HDR image. Further, the method includes storing the HDR image.

Accordingly the various embodiments herein provide a method for generating an HDR image of a scene in an imaging device. The method includes capturing an HDR image of the scene. Further, the method includes correcting at least one of an alignment error and a brightness error in the captured HDR image. Further, the method includes generating the HDR image based on the correction. Further, the method includes storing the HDR image.

Accordingly the various embodiments herein disclose an imaging device for generating an HDR image of a scene. The imaging device includes at least one sensor, an alignment controller, a weight-map generator, a brightness correction controller, a fusion controller and a memory. Further, the sensor is configured to capture an LE image, an SE image, and an AE image of the scene. Further, the alignment controller is configured for estimating a motion information in the SE image and the LE image based on a reference image, and aligning individually the SE image and the LE image using the estimated motion information, wherein the motion information include at least one of a translation and a rotation of the imaging device in undistorted regions of the AE image and the at least one of the SE image and the LE image, and wherein the reference image is determined based on an image statistics parameter. Further, the weight-map generator is configured for generating a pixel weight coefficient for each of the SE image, the LE image and the AE image. Further, the brightness correction controller is configured for generating an overlap region mask corresponding to an overlap region in each of the SE image, the LE image and the AE image, and modifying the pixel weight coefficient in the generated overlapped region mask to correct a brightness difference. Further, the fusion controller is configured for fusing the SE image, the LE image and the AE image using the modified pixel-weight coefficient to generate the HDR image. Further, the memory is configured to store the HDR image.

Accordingly the various embodiments herein disclose an imaging device for generating an HDR image of a scene. The imaging device includes at least one sensor, an alignment controller, a weight-map generator, a fusion controller and a memory. Further, the sensor is configured for capturing a LE image, a SE image, and an AE image of the scene. Further, the alignment controller is configured for estimating a motion information in the SE image and the LE image based on a reference image, and aligning individually the SE image and the LE image using the estimated motion information. Further, the weight-map generator is configured for generating a pixel weight coefficient for each of the SE image, the LE image and the AE image. Further, the fusion controller is configured for fusing the SE image, the LE image and the AE image using the pixel-weight coefficient to generate the HDR image. Further, the memory is configured for storing the HDR image.

Accordingly, the various embodiments herein disclose an imaging device for generating an HDR image of a scene. The imaging device includes at least one sensor, an HDR image generator and a memory. Further, the sensor is configured for capturing a LE image, a SE image, and an AE image of the scene. Further, the HDR image generator is configured for correcting at least one of an alignment error and a brightness error in the captured HDR image, and generating the HDR image based on the correction. Further, the memory is configured for storing the HDR image.

Accordingly the various embodiments herein provide a method for generating an HDR (preferably 360-degree covering) image of a scene using an imaging device. The method includes capturing a LE image, a SE image, and an AE image of the scene. Further, the method includes estimating a motion information in the SE image and the LE image based on a reference image, wherein the motion information include at least one of a translation and a rotation of the imaging device in undistorted regions of the AE image and the at least one of the SE image and the LE image, and wherein the reference image is determined based on an image statistics parameter. Further, the method includes aligning individually the SE image and the LE image using the estimated motion information. Further, the method includes generating a pixel weight coefficient for each of the SE image, the LE image and the AE image. Further, the method includes generating an overlap region mask corresponding to an overlap region in each of the SE image, the LE image and the AE image. Further, the method includes modifying the pixel weight coefficient in the generated overlapped region mask to correct a brightness difference. Further, the method includes fusing the SE image, the LE image and the AE image using the modified pixel-weight coefficient to generate the HDR image. Further, the method includes storing the HDR image.

The method can be used to generate the HDR image with better quality by processing the SE image, the LE image and the AE image in a fish-eye domain itself without any rectilinear conversion. This results in generating the HDR image in a quick manner. The method can be used to generate the HDR image by processing the SE image, the LE image and the AE image in the fish-eye domain itself with less computational power.

The proposed method can be used to generate the fisheye HDR images within the imaging device without using high end hardware elements. The proposed method can be used to generate the fisheye HDR images within the imaging device in a cost effective manner.

The imaging device can be used to generate the fisheye HDR image of the scene comprising a moving object. The imaging device aligns the SE image and LE image of the scene to compensate the motion of an object in the scene while capturing the images. Thus a blurred image formation can be removed in the 360-degree HDR image.

In the proposed method, the formation of a visible line in an overlapping region of stitched rectilinear HDR images of the front scene and the rear scene is removed by providing a brightness correction at the overlapping region. Thus the HDR images attain a better quality by maintaining the continuity of the objects in the stitched rectilinear HDR images of the front scene and the rear scene, without making any pixel misalignment or color imperfections.

In photography, bracketing is a general technique of taking several shots of the same scene using a different camera settings for exposure, flash, white balance, international organization for standardization (ISO) levels, focus etc. HDR imaging is an image processing technique to increase a dynamic range of the scene by fusing/merging the exposure bracketed images. The exposure bracketed images are captured with different exposure time in subsequent images. The exposure time refers to an effective amount of light hitting on a sensor. In an example, a LE image might be considered as over-exposed image to create a bright image, while the SE image might be considered as under-exposed to create a dark image. An AE might be considered as medium-exposed image to create the image with the bright and dark balance. The HDR imaging presents a more versatile and natural image representation in line with human vision.

An HDR image can be generated by merging the exposure bracketed images from the same camera for the same scene. However, due to hand shaking or environmental conditions, some camera motion (typically rotational and/or translational) should be expected between each picture. Hence, a misalignment of the exposure bracketed images may occur due to camera motion which results in a blurry HDR image.

Implementing the HDR imaging to generate a fisheye HDR image on an imaging device, which has a limited computational power and memory, has various challenges associated with it.

Before fusing the exposure bracketed images in the imaging device, the images have to be converted into the corresponding rectilinear images, to generate a rectilinear HDR image. This results in an excess of time consumption on the imaging device having an accompanying processor which has low computational power and memory.

Due to a low working space memory in the imaging device, the LE image, the AE image and the SE image of the scene are processed independently to generate the fisheye HDR image of the scene. This can cause a brightness mismatch in the fisheye HDR images of the front scene and the rear scene.

Referring now to the drawings, and more particularly to FIGS. 1 through 19, there are shown various embodiments.

FIG. 1 illustrates an overview of a system for generating a rectilinear HDR image from exposure bracketed fisheye images according to an embodiment of the disclosure.

Referring to FIG. 1, the system includes an imaging device 100 and an electronic device 200. The exposure bracketed fisheye images include an LE image of the scene, an AE image of the same scene, and an SE image of the same scene.

The LE image, the AE image and the SE image of the scene from the imaging device 100 are transferred to the electronic device 200. The electronic device 200 converts the LE image, the AE image and the SE image to corresponding rectilinear-LE image, rectilinear-AE image and rectilinear-SE image respectively. Further, the rectilinear-LE image, the rectilinear-AE image and the rectilinear-SE image are combined together by an HDR controller 202 in the electronic device 200 to form the rectilinear HDR image of the scene. Further, a rectilinear image can be generated by stitching the rectilinear HDR images in the electronic device 200.

Figure 2:
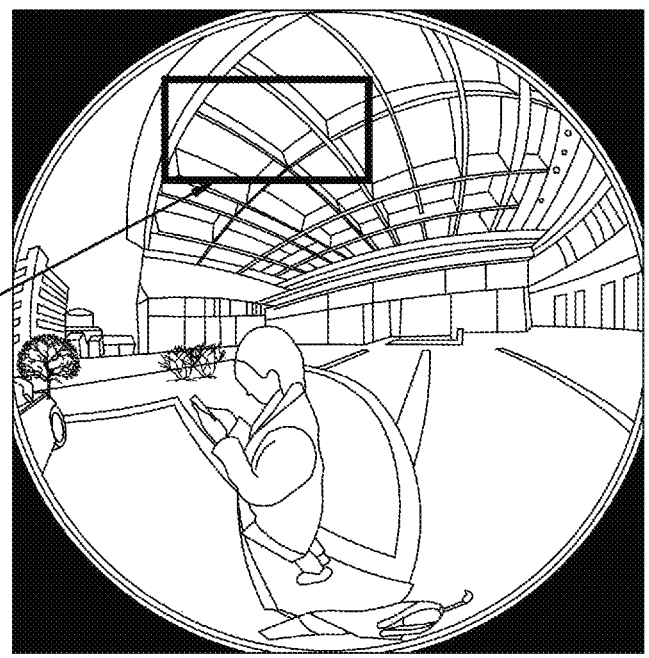
FIG. 2 illustrates a fisheye image of a front scene of an imaging device according to an embodiment of the disclosure.

FIG. 2 illustrates a fisheye image of a front scene of an imaging device according to an embodiment of the disclosure.

Referring to FIG. 2, the fisheye lens uses the special mapping (e.g., equisolidangle projection) for projecting the exposed scene into the characteristic convex non-rectilinear appearance. Hence, the straight lines in the real world have become curvy in the fisheye image of the scene.

Figure 3:
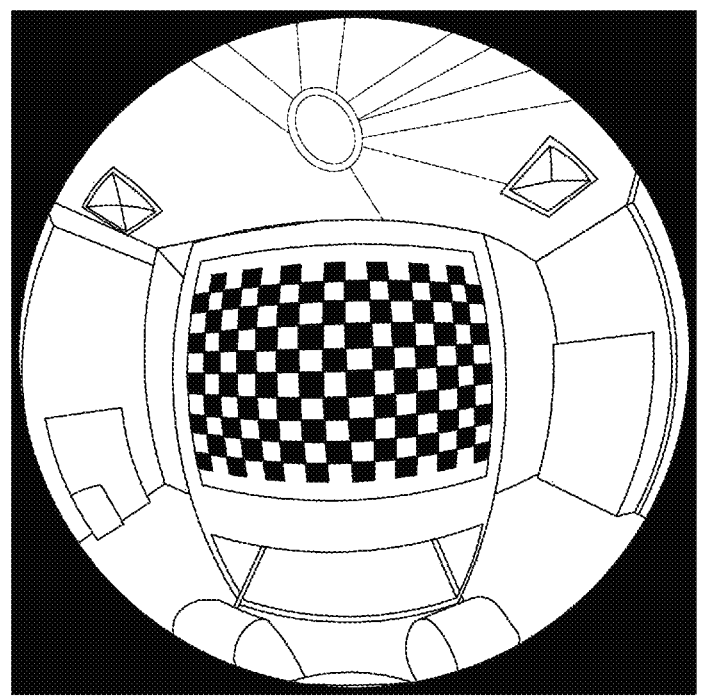
FIG. 3 illustrates a visual distortion in various regions in a fisheye image according to an embodiment of the disclosure.

FIG. 3 illustrates a visual distortion in various regions in a fisheye image according to an embodiment of the disclosure.

Referring to FIG. 3, while moving away from the central region of the fisheye image, the distortion is gradually increased and maximum at an edge part of the fisheye image. Further, a pure translational motion parallel to a plane has a different impact based on distance from an image center.

Further, the pixels away from the image center have more spherical distortion than other regions in the fish-eye image. Thus, image alignment in the fish-eye domain has following technical challenges such as estimating the parameters of motion-model (translation and rotation), and performing the alignment in the fish-eye domain considering spherical distortion aspects.

Figure 4:
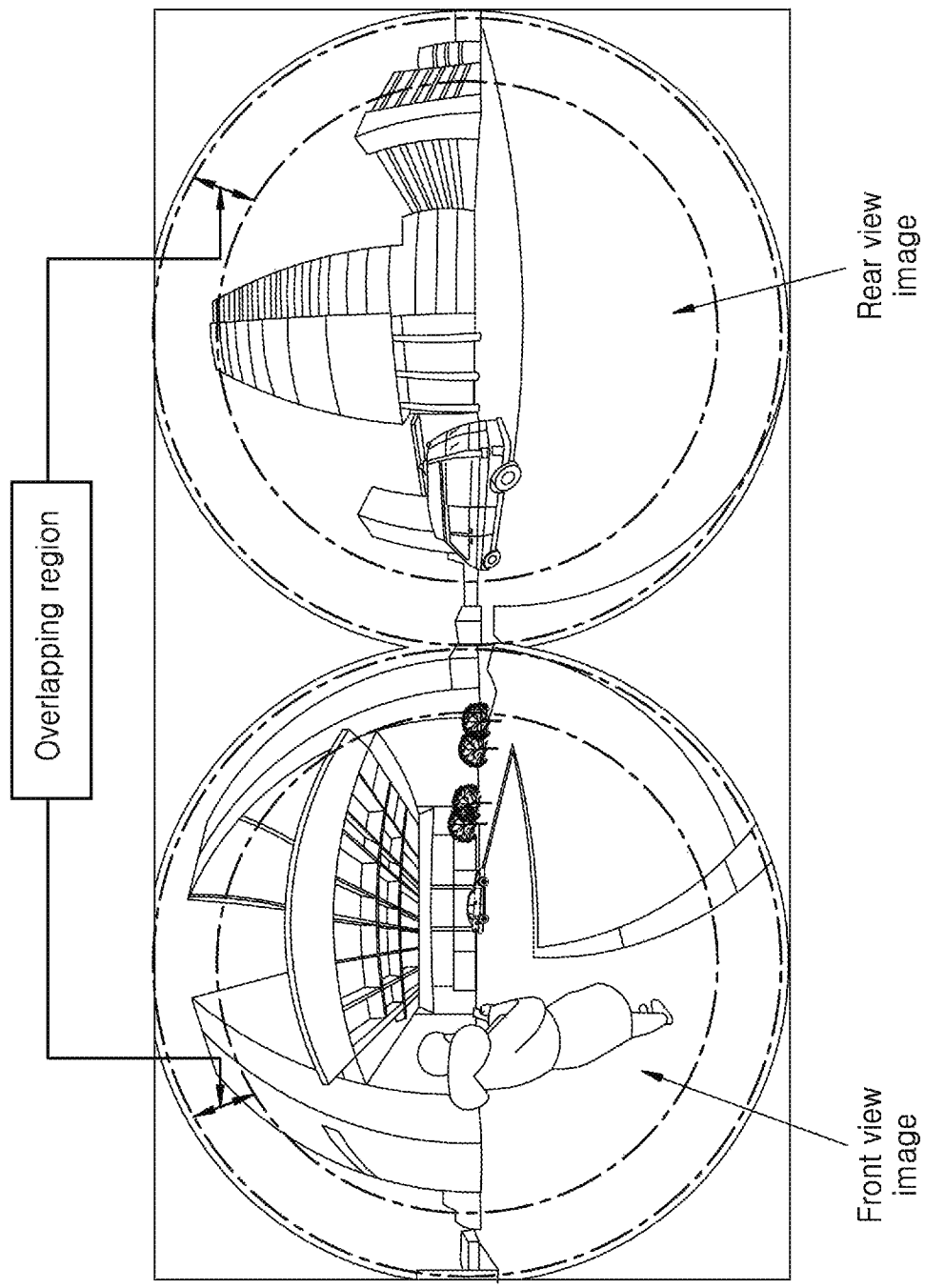
FIG. 4 illustrates an overlapping region in fisheye images of a front scene and a rear scene of an imaging device according to an embodiment of the disclosure.

FIG. 4 illustrates an overlapping region in fisheye images of a front scene and a rear scene of an imaging device according to an embodiment of the disclosure.

Referring to FIG. 4, the region between an outer circle and an inner circle represent the overlapping region in both the fisheye images of the front scene and the rear scene of the imaging device 100. The brightness mismatch is formed at this region during the generation of HDR image.

Figure 5:
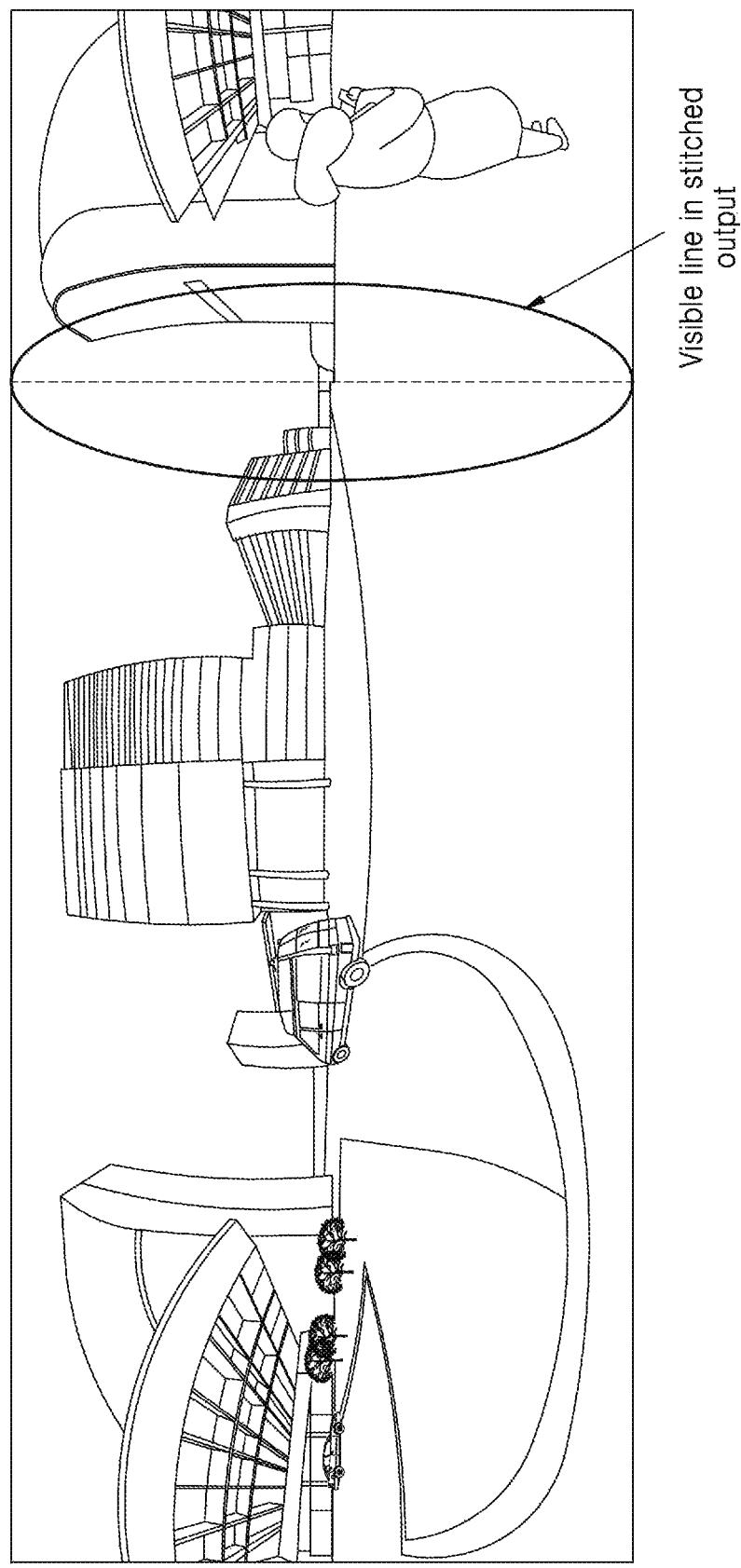
FIG. 5 illustrates a visible line in a stitched rectilinear HDR images of a front scene and a rear scene according to an embodiment of the disclosure.

FIG. 5 illustrates a visible line in stitched rectilinear HDR images of a front scene and a rear scene according to an embodiment of the disclosure.

Referring to FIG. 5, due to a low working space memory in the imaging device 100, the LE image, the AE image and the SE image of the scene are processed independently to generate the fisheye HDR image of the front and rear scenes. This may cause the brightness mismatch at the overlapping region in the HDR images of the front scene and the rear scene upon stitching the rectilinear HDR images and to form the stitched rectilinear HDR image. Thus, the stitched rectilinear HDR image has the visible line at the overlapping region.

Figure 6:
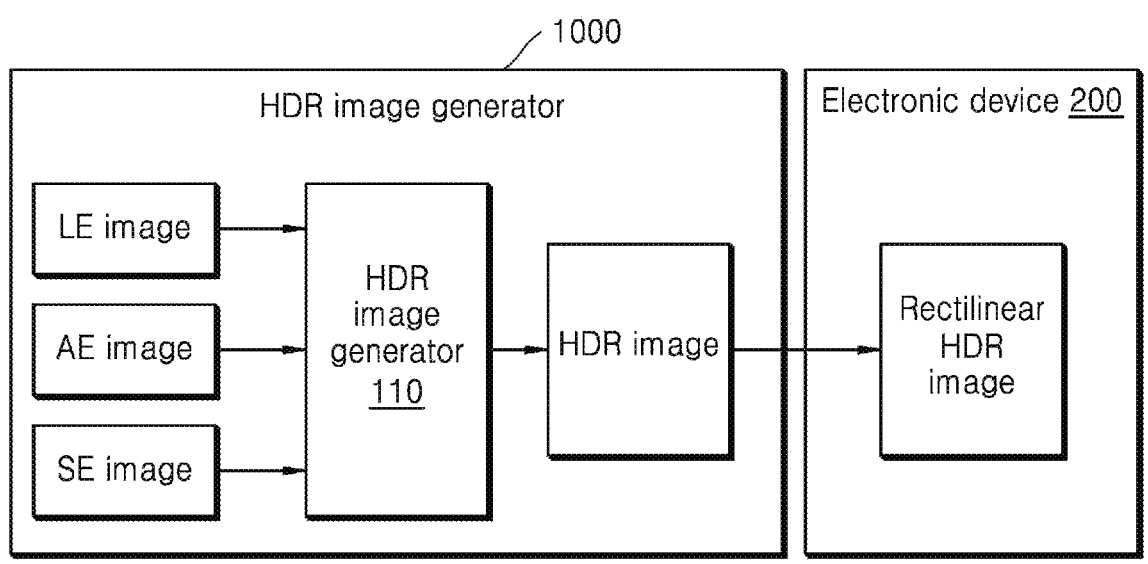
FIG. 6 illustrates an overview of a system for generation of a rectilinear HDR image according to an embodiment of the disclosure.

FIG. 6 illustrates an overview of a system for generation of a rectilinear HDR image according to an embodiment of the disclosure.

Referring to FIG. 6, in an embodiment, a system 1000 includes an imaging device 100 and an electronic device 200. The imaging device 100 can comprise, for example, but not limited to, a camera device, a Gear 360 device (i.e., a head mounted display (HIVID) for virtual or augmented reality, etc.), or the like. The electronic device 200 can be, for example, but not limited to, a smartphone, a tablet computer, a mobile device, a personal digital assistant (PDA), a multimedia device, a video device, or the like.

Referring to FIG. 6, the imaging device 100 includes a sensor (not shown) and an HDR image generator 110. The sensor is configured to capture the LE image, the SE image, and an AE image of the scene. After capturing the LE image, the SE image, and the AE image of the scene, the HDR image generator 110 is configured to generate the HDR image based on the LE image, the SE image, and the AE image.

In an embodiment of the disclosure, the HDR image generator 110 may estimate motion information in the SE image and the LE image based on a reference image. Further, the HDR image generator 110 may align individually the SE image and the LE image using the estimated motion information.

In an embodiment of the disclosure, the motion information includes at least one of a translation and a rotation of the imaging device 100 in undistorted regions of the AE image and the at least one of the SE image and the LE image.

In an embodiment, the motion information in the SE image and the LE image is estimated by detecting feature-points in undistorted regions of in the AE image as the reference image and at least one of the SE image and the LE image, and determining pairwise matches in the undistorted region based on the detected feature-points.

In the embodiment of the disclosure, the reference image is determined based on an image statistics parameter (e.g., mean brightness value or the like).

After aligning the SE image and the LE image, the HDR image generator 110 may generate a pixel weight coefficient for each of the SE image, the LE image and the AE image.

Further, the HDR image generator 110 may generate an overlap region mask corresponding to the overlap region in each of the SE image, the LE image and the AE image, and modify the pixel weight coefficient in the generated overlapped region mask to correct a brightness difference.

After correcting the brightness difference, the HDR image generator 110 may fuse or combine the SE image, the LE image and the AE image using the pixel-weight coefficient to generate a fused image.

In an embodiment of the disclosure, the brightness difference is corrected by determining a distance between each pixel location from a center of the AE image, detecting whether the distance meets a threshold, and modulating an HDR weight of each of the SE image and the LE image in response to determining that the distance meets the threshold.

In an embodiment of the disclosure, the brightness difference is corrected by determining the distance between each pixel location from the center of the AE image, detecting whether the distance meets the threshold, and using a default weight of each of the SE image and the LE image and the AE image in response to determining that the distance does not meets a predetermined threshold.

In an embodiment, the HDR weight of each of the SE image and the LE image is modulated by suppressing weights of the LE image and the SE image and enhancing weights of the AE image based on the distance from the center of the AE image.

After generating the HDR image, the imaging device 100 stores the HDR image. Further, the HDR image is transferred to the electronic device 200 to convert the HDR image to the rectilinear HDR image.

The imaging device 100 can be operated in a single lens mode or in a dual lens mode. In the single lens mode, while capturing the scene, either the front sensor or the rear sensor becomes active to capture the scene by the imaging device 100. In the dual lens mode, both the front and rear sensors become active to capture the scene by the imaging device 100.

In an embodiment of the disclosure, the imaging device 100 may capture the LE image, the SE image, and the AE image in an HDR mode.

Although FIG. 6 shows the hardware components of the system 1000 but it is to be understood that other embodiments are not limited thereon. In other embodiments, the system 1000 may include less or more number of components. Further, the labels or names of the components are used only for illustrative purpose and does not limit the scope of the disclosure. One or more components can be combined together to perform same or substantially similar function to generate the HDR image. For example, the image generator may be implemented as at least one hardware processor.

Figure 7:
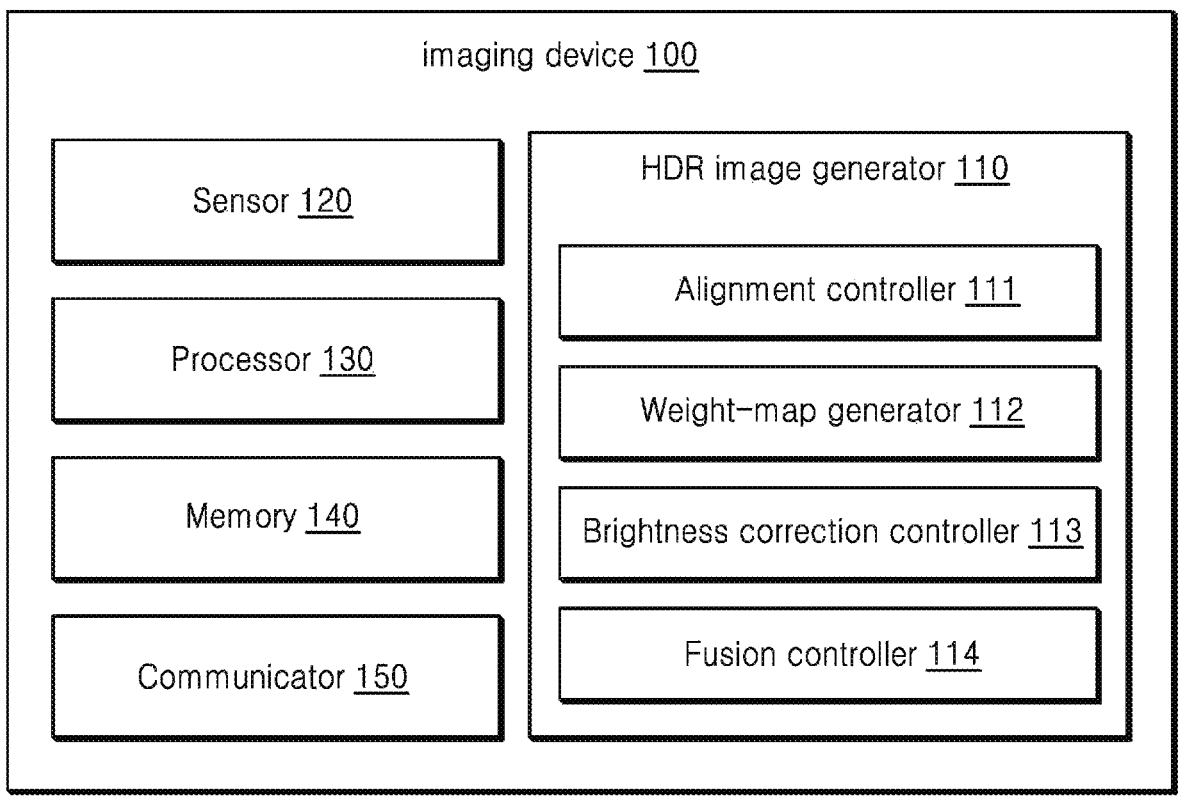
FIG. 7 is a block diagram illustrating an imaging device according to various embodiments of the disclosure.

FIG. 7 is a block diagram illustrating an imaging device according to various embodiments of the disclosure.

Referring to FIG. 7, in an embodiment of the disclosure, the imaging device 100 includes the HDR image generator 110, the sensor 120, a processor 130, a memory 140, and a communicator 150. The HDR image generator 110 includes an alignment controller 111, a weight-map generator 112, a brightness correction controller 113, and a fusion controller 114. The processor 130, communicator 150, and the HDR image generator may be implemented as at least one hardware processor(s).

The sensor 120 may capture the LE image, the SE image, and the AE image of the scene. After capturing the LE image, the SE image, and the AE image of the scene, the alignment controller 111 may estimate the motion information in the SE image and the LE image based on the AE image as the reference image. Further, the alignment controller 111 may align individually the SE image and the LE image using the estimated motion information. The motion information includes at least one of the translation and the rotation of the imaging device 100 in undistorted regions of the AE image and the at least one of the SE image and the LE image.

In an embodiment of the disclosure, the alignment controller 111 may detect the feature-points in the undistorted regions of in the AE image as the reference image and at least one of the SE image and the LE image. Based on the detected feature-points, the alignment controller 111 may determine the pairwise matches in the undistorted region. Based on the pairwise matches, the alignment controller 111 may estimate the motion information.

Further, weight-map generator 112 may generate the pixel weight coefficient for each of the SE image, the LE image and the AE image. The brightness correction controller 113 is configured to generate the overlap region mask corresponding to the overlap region in each of the SE image, the LE image and the AE image. Further, the brightness correction controller 113 may modify the pixel weight coefficient in the generated overlapped region mask to correct a brightness difference.

In an embodiment of the disclosure, the weight-map generator 112 determines the pixel weight coefficient for each of the LE image, the AE image and the SE image using a look-up table (LUT).

In an embodiment of the disclosure, the weight-map generator 112 may determine a ghost map for each of the LE image, the AE image and the SE image. The pixel weight coefficient of each of the LE, SE and AE images are modified based on the computed ghost map distribution for each images.

The weight-map generator 112 determines a modified pixel weight coefficient for each of the LE image, the AE image and the SE image by adjusting the pixel weight coefficient based on the computed ghost map. The weight-map generator 112 generates the LE image, the AE image and the SE image with the modified pixel weight coefficients for of the LE image, the AE image and the SE image. The weight-map generator 112 transfers the LE image, the AE image and the SE image having the modified pixel weight coefficient to the brightness correction controller 113.

In an embodiment of the disclosure, the brightness correction controller 113 may determine a distance between each pixel location from the center of the AE image. Further, the brightness correction controller 113 may detect whether the distance meets a predetermined threshold. The threshold is set by the user or an original equipment manufacturer (OEM) in advance. Further, the brightness correction controller 113 may modulate the HDR weight of each of the SE image and the LE image in response to a determination that the distance meets the predetermined threshold.

In an embodiment of the disclosure, the brightness correction controller 113 may determine a distance between each pixel location from the center of the AE image. Further, the brightness correction controller 113 may detect whether the distance meets a predetermined threshold. Further, the brightness correction controller 113 may utilize the default weight of each of the SE image and the LE image in response to a determination that the distance does not meets the predetermined threshold.

In an embodiment of the disclosure, the HDR weight of each of the SE image and the LE image is modulated by suppressing weights of the LE image and the SE image and enhancing weights of the AE image based on the distance from the center of the AE image.

In an embodiment of the disclosure, the brightness correction controller 113 may correct the brightness in the LE image, the AE image and the SE image having the modified pixel weight coefficient. The brightness correction controller 113 modifies the pixel weight coefficient with the normal/default weights to correct the brightness in the LE image, the AE image and the SE image in the single lens mode.

In an embodiment of the disclosure, the brightness correction controller 113 may modify the pixel weight coefficient in an overlapping region with the modulated weights to correct the brightness difference in the overlapping region in the LE image and the SE image of the front and rear scenes in the dual lens mode.

The brightness correction controller 113 can transfer the LE image, the AE image and the SE image to the fusion controller 114 after performing brightness correction.

Further, the fusion controller may fuse the SE image, the LE image and the AE image using the modified pixel-weight coefficient to generate an HDR image.

After generating the HDR image, the memory 140 stores the HDR image.

Further, the HDR image is transferred to an electronic device 200 to convert the HDR image in the fisheye domain to the rectilinear HDR image.

The fusion controller 114 merges/fuses the LE image, AE image and SE image to generate the HDR image.

The HDR image generator 110 can be coupled to the sensor 120, the processor 130, the memory 140 and the communicator 150. The processor 130 may execute instructions stored in the memory 140 and perform various operations.

The memory 140 stores instructions to be executed by the processor 130. The memory 140 also stores the captured LE image, AE image and SE image of the scene. Further, the memory 140 receives and stores the HDR image generated from the HDR image generator 110. The memory 140 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

In addition, the memory 140 may, in some examples, be considered a non-transitory storage medium. The term "non-transitory" may indicate that the storage medium is not embodied in a carrier wave or a propagated signal. However, the term "non-transitory" should not be interpreted that the memory 140 is non-movable. In some examples, the memory 140 can be configured to store larger amounts of information than the memory. In certain examples, a non-transitory storage medium may store data that can, over time, change (e.g., in RAM or cache).

The communicator 150 may enables the imaging device 100 to communicate with the electronic device 200 via a wired or a wireless communications. The imaging device 100 transmits the generated HDR image to the electronic device 200 through the communicator 150.

In an embodiment of the disclosure, the reference image as the AE image is merely used for explanation purpose. But, in the implementation, any of the input images can be selected as the reference image based on a reference selection criterion. The reference selection criterion is set by the user or the OEM in advance.

Although FIG. 7 shows the hardware components of the imaging device 100 but it is to be understood that other embodiments are not limited thereon. In other embodiments, the imaging device 100 may include less or more number of components. Further, the labels or names of the components are used only for illustrative purpose and does not limit the scope of the disclosure. One or more components can be combined together to perform same or substantially similar function to generate the HDR image.

Figure 8:
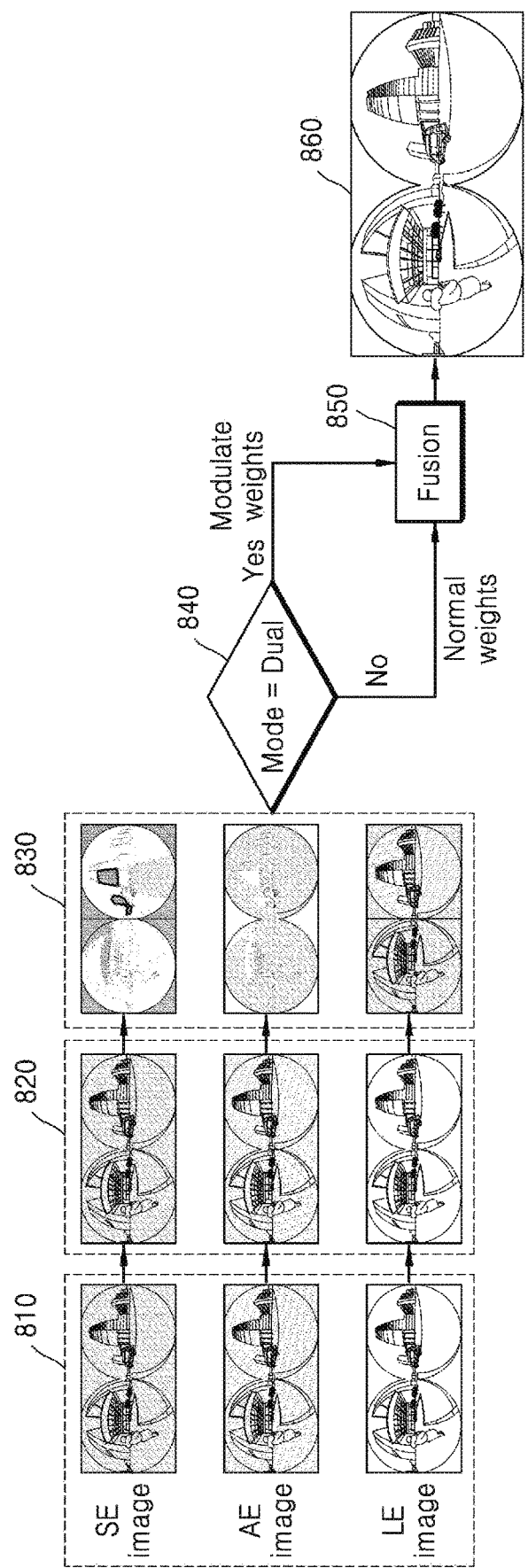
FIG. 8 illustrates a diagram of various operations involved in generation of an HDR image according to an embodiment of the disclosure.

FIG. 8 illustrates a diagram of various operations involved in generation of an HDR image according to an embodiment of the disclosure.

Referring to FIG. 8, initially, the imaging device 100 may capture the LE image, the AE image and the SE image of the scene using the sensor 120 in operation 810. In operation 820, the sensor 120 transfers the captured LE, AE and SE images of the scene to the alignment controller 111 in the imaging device 100. The alignment controller 111 determines the motion model for the LE image and the SE image with respect to the reference AE image to estimate the motion information of the imaging device 100 during capturing the LE image, the AE image and the SE image. The motion information is used to determine the motion model for the LE image and the SE image. The motion information is estimated by performing the pairwise match of the motion information of the feature points in the LE image and the SE image with reference to motion information of the feature points in the AE image.

Further the alignment controller 111 aligns the LE image and the SE image by estimating a new pixel location for each pixel in the LE image and the SE image based on the motion model. The new pixel location of each pixel in the LE image and the SE image are used to generate the aligned LE and SE images.

In operation 830, the LE image and the SE image and the AE image are transferred to the weight-map generator 112. The weight-map generator 112 determines the pixel weight coefficient for each of the LE image, the AE image and the SE image using the LUT. Further, the weight-map generator 112 determines the ghost map for each of the LE image, the AE image and the SE image.

The weight-map generator 112 determines the modified pixel weight coefficient for each of the LE image, the AE image and the SE image by adjusting the pixel weight coefficient based on the corresponding computed ghost map. Finally, the weight-map generator 112 generates the LE image, the AE image and the SE image with modified pixel weight coefficients.

In operations 840 and 850, the LE image, the AE image and the SE image having the modified pixel weight coefficient are further transferred to the brightness correction controller 113. The brightness correction controller 113 detects the lens mode (i.e., single lens mode or dual lens mode) of the imaging device 100. The brightness correction controller 113 uses the pixel weight coefficient with the normal/default weights, upon detecting the lens mode as the single lens mode.

Upon detecting the lens mode as the dual lens mode, the brightness correction controller 113 modifies the pixel weight coefficient with the modulated weights in the overlapping region of the LE image, the AE image and the SE image of the scenes, to correct the brightness difference in the overlapping regions.

In operation 850, the LE image, the AE image and the SE image from the brightness correction controller 113 are transferred to the fusion controller 114. The fusion controller 114 merges/fuses the LE image, the AE image and the SE image to generate an HDR image in operation 860. The foregoing operations can be performed within the imaging device 100, so that the operations avoid the intermediate domain conversion, so as to reduce processing time for generating the HDR image. The foregoing operations can be used to generate the HDR image on the imaging device 100 with less computational power.

FIG. 9A is a flow diagram illustrating a method for generating an HDR image according to various embodiments of the disclosure.

Referring to FIG. 9A, a flow diagram S9000 illustrates generating an HDR image. In operation S9002, the LE image, the SE image, and the AE image of the scene are captured by the sensor 120 of the imaging device 100. In operation S9004, the method includes estimating the motion information in the LE image and the SE image based on the AE image as a reference image. The motion information include at least one of the translation and the rotation of the imaging device 100 in the undistorted regions of the AE image and the at least one of the SE image and the LE image. In an embodiment of the disclosure, the method allows the alignment controller 111 to estimate the motion information in the LE image and the SE image based on the AE image as the reference image.

In operation S9006, the method includes aligning individually the SE image and the LE image using the estimated motion information. In an embodiment of the disclosure, the method allows the alignment controller 111 to align individually the SE image and the LE image using the estimated motion information.

In operation S9008, the method includes generating the pixel weight coefficient for each of the SE image, the LE image and the AE image. In an embodiment of the disclosure, the method allows the weight-map generator 112 to generate the pixel weight coefficient for each of the SE image, the LE image and the AE image.

In operation S9010, the method includes generating the overlap region mask corresponding to the overlap region in each of the SE image, the LE image and the AE image. In an embodiment of the disclosure, the method allows the brightness correction controller 113 to generate the overlap region mask corresponding to the overlap region in each of the SE image, the LE image and the AE image. In operation S9012, the method includes modifying the pixel weight coefficient in the generated overlapped region mask to correct the brightness difference. In an embodiment of the disclosure, the method allows the brightness correction controller 113 to modify the pixel weight coefficient in the generated overlapped region mask to correct the brightness difference.

In operation S9014, the method includes fusing the SE image, the LE image and the AE image using the pixel-weight coefficient to generate the HDR image. In an embodiment of the disclosure, the method allows the fusion controller 114 to fuse the SE image, the LE image and the AE image using the pixel-weight coefficient to generate the HDR image. In operation S9016, the method includes storing the HDR image. In an embodiment of the disclosure, the method allows the memory 140 to store the HDR image.

The various actions, acts, blocks, operations, or the like in the flow diagram S9000 may be performed in the order presented, in a different order or simultaneously. Further, in some embodiments, some of the actions, acts, blocks, operations, or the like may be omitted, added, modified, skipped, or the like without departing from the scope of the disclosure.

Figure 9B:
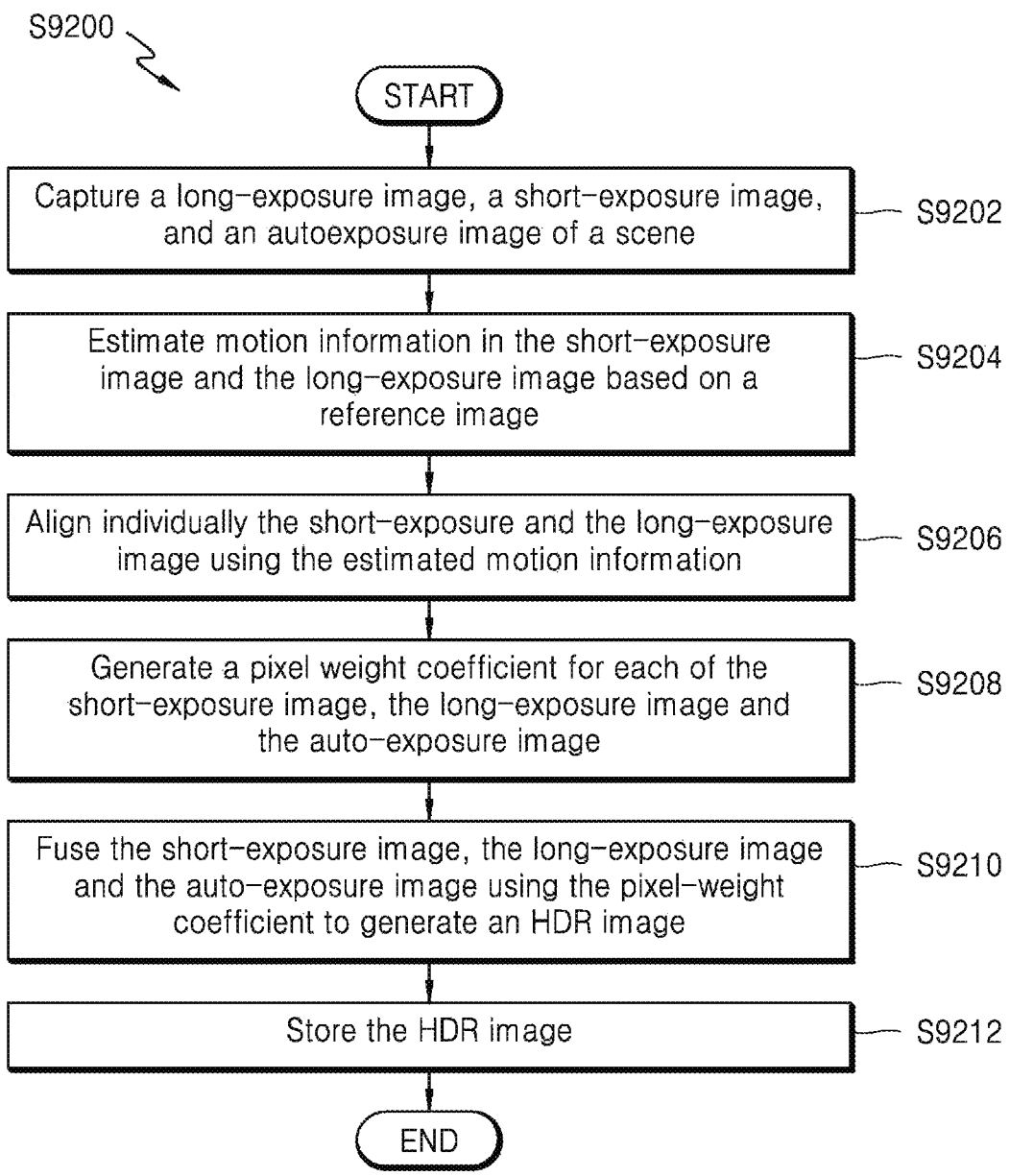
FIG. 9B is a flow diagram illustrating a method for generating an HDR image according to various embodiments of the disclosure.

FIG. 9B is a flow diagram illustrating a method for generating an HDR image according to various embodiments of the disclosure.

Referring to FIG. 9B, another example flow diagram S9200 for generating an HDR image is illustrated. In operation S9202, the method includes capturing the LE image, the SE image, and the AE image of the scene. In an embodiment of the disclosure, the method allows the sensor 120 to capture the LE image, the SE image, and the AE image of the scene. In operation S9204, the method includes estimating the motion information in the SE image and the LE image based on the reference image. The reference image is determined based on the image statistics parameter. In an embodiment of the disclosure, the method allows the alignment controller 111 to estimate the motion information in the SE image and the LE image based on the reference image, wherein the reference image is determined based on the image statistics parameter.

In operation S9206, the method includes aligning individually the SE image and the LE image using the estimated motion information. In an embodiment of the disclosure, the method allows the alignment controller 111 to align individually the SE image and the LE image using the estimated motion information. In operation S9208, the method includes generating the pixel weight coefficient for each of the SE image, the LE image and the AE image. In an embodiment of the disclosure, the method allows the weight-map generator 112 to generate the pixel weight coefficient for each of the SE image, the LE image and the AE image.

In operation S9210, the method includes fusing the SE image, the LE image and the AE image using the pixel-weight coefficient to generate the HDR image. In an embodiment of the disclosure, the method allows the fusion controller 114 to fuse the SE image, the LE image and the AE image using the pixel-weight coefficient to generate the HDR image. In operation S9212, the method includes storing the HDR image.

The various actions, acts, blocks, operations, or the like in the flow diagram of S9200 may be performed in the order presented, in a different order or simultaneously. Further, in some embodiments, some of the actions, acts, blocks, operations, or the like may be omitted, added, modified, skipped, or the like without departing from the scope of the disclosure.

Figure 9C:
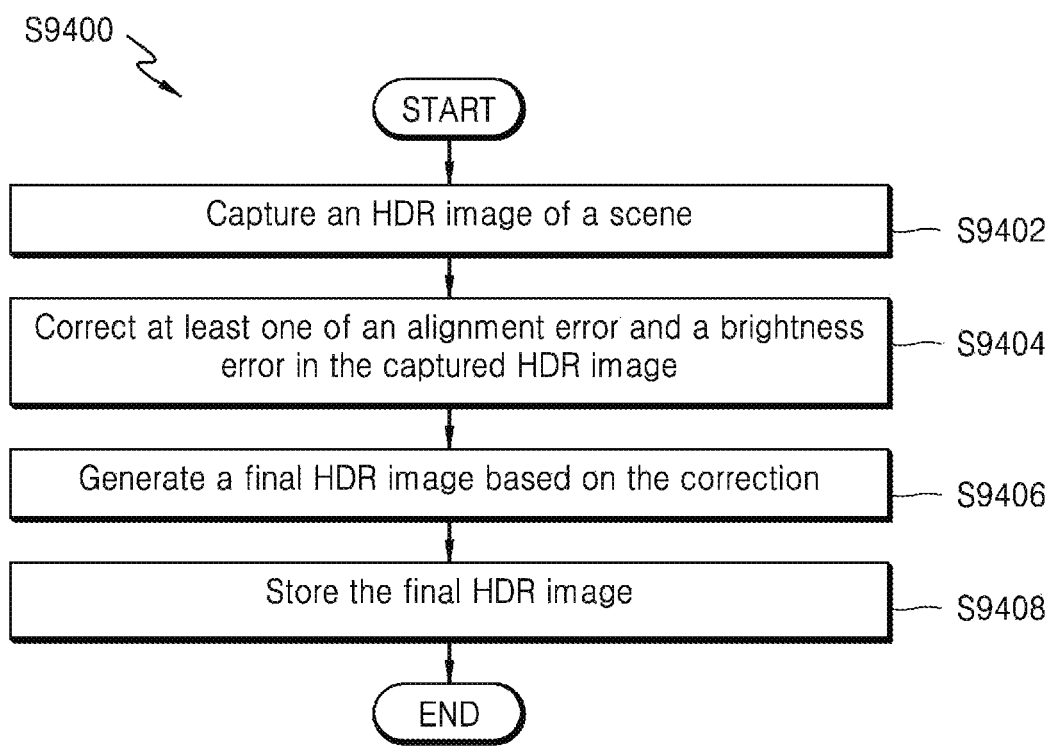
FIG. 9C is a flow diagram illustrating a method for generating an HDR image by correcting an alignment error and a brightness error according to various embodiments of the disclosure.

FIG. 9C is a flow diagram illustrating a method for generating an HDR image by correcting an alignment error and a brightness error according to various embodiments of the disclosure.

Referring to FIG. 9C, another example flow diagram S9400 for generating an HDR image is illustrated. In operation S9402, the method includes capturing the HDR image of the scene. In an embodiment of the disclosure, the method allows the sensor 120 to capture the HDR image of the scene. In operation S9404, the method includes correcting at least one of the alignment error and the brightness error in the captured HDR image. In an embodiment of the disclosure, the method allows the HDR image generator 110 to correct at least one of the alignment error and the brightness error in the captured HDR image.

In operation S9406, the method includes generating the HDR image based on the correction. In an embodiment, the method allows the HDR image generator 110 to generate the HDR image based on the correction. In operation S9408, the method includes storing the HDR image. In an embodiment of the disclosure, the method allows the sensor 120 to the memory 140 to store the HDR image.

The various actions, acts, blocks, operations, or the like in the flow diagram of S9400 may be performed in the order presented, in a different order or simultaneously. Further, in some embodiments, some of the actions, acts, blocks, operations, or the like may be omitted, added, modified, skipped, or the like without departing from the scope of the disclosure.

Figure 10:
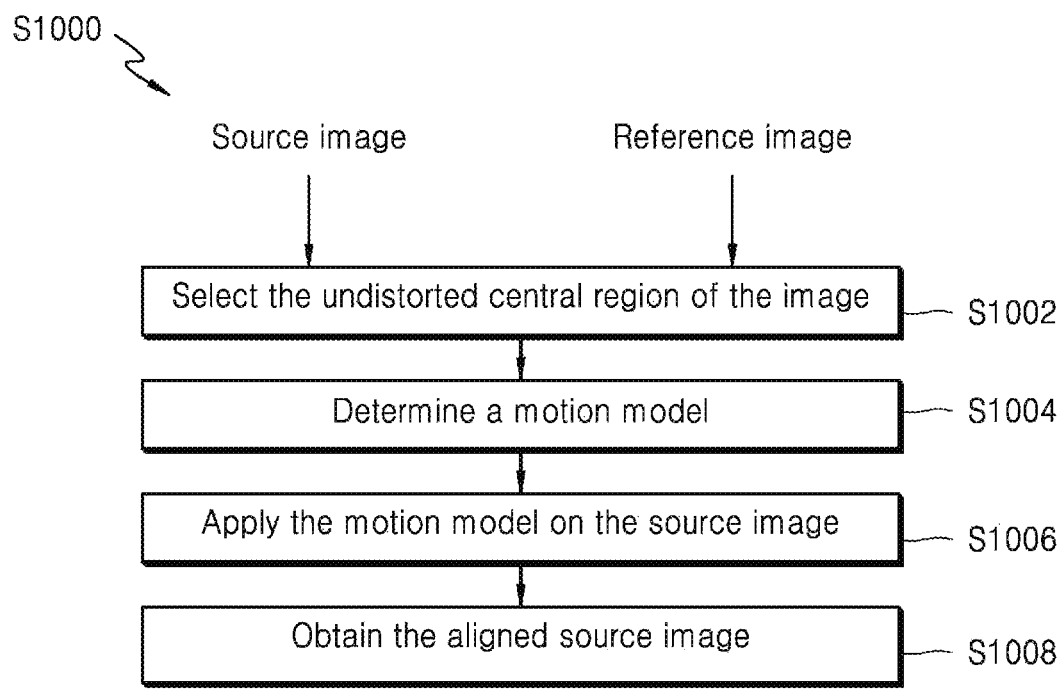
FIG. 10 is a flow diagram illustrating a method for aligning a source image with respect to a reference image according to various embodiments of the disclosure.

FIG. 10 is a flow diagram illustrating a method for aligning a source image with respect to a reference image according to various embodiments of the disclosure.

Referring to FIG. 10, another example flow diagram S1000 illustrates aligning a source image based on a reference image. In an embodiment of the disclosure, the source image includes the LE image and the SE image of the scene. Further, the reference image includes the AE image of the same scene. The captured source image and the captured reference image are transferred to the alignment controller 111 from the sensor 120 to align the source image.

In operation S1002, the method includes selecting the undistorted central region in the source image and the reference image. In an embodiment of the disclosure, the method allows the alignment controller 111 to select the undistorted central region in the source image and the reference image. In operation S1004, the method includes determining the motion model for the source image. The motion model for the source image is determined based on the motion information of the feature points in the selected undistorted region in the source image and the reference image. In an embodiment, the method allows the alignment controller 111 to estimate the motion model for the source image.

In operation S1006, the method includes applying the motion model on the source image to obtain the aligned source image. In an embodiment of the disclosure, the method allows the alignment controller 111 to apply the motion model on the source image. In operation S1008, the method includes obtaining the aligned source image.

The various actions, acts, blocks, operations, or the like in the flow diagram S1000 may be performed in the order presented, in a different order or simultaneously. Further, in some embodiments, some of the actions, acts, blocks, operations, or the like may be omitted, added, modified, skipped, or the like without departing from the scope of the disclosure.

Figure 11:
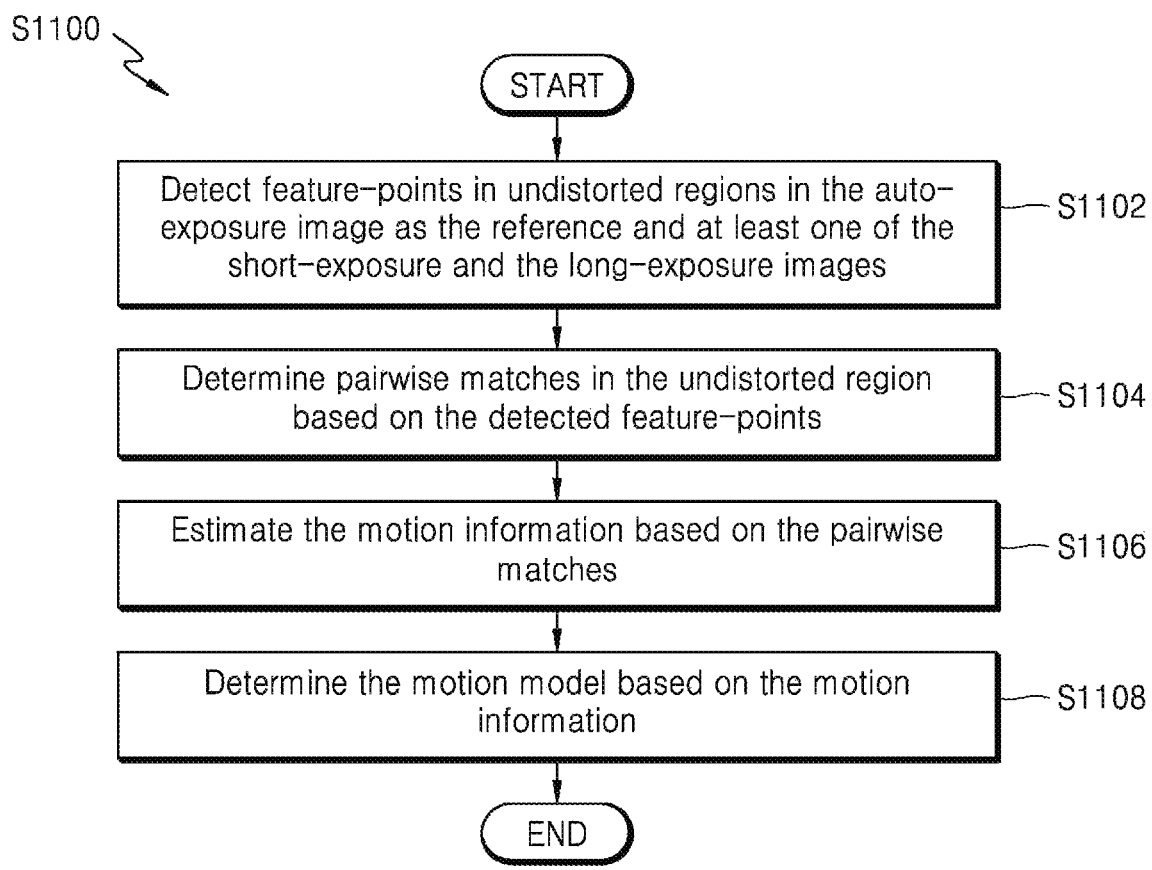
FIG. 11 is a flow diagram illustrating a method for determining a motion model for aligning a source image according to various embodiments of the disclosure.

FIG. 11 is a flow diagram illustrating a method for determining a motion model for aligning a source image according to various embodiments of the disclosure.

Referring to FIG. 11, an example flow diagram S1100 for generating a motion model is illustrated. In operation S1102, the method includes detecting the feature-points in the undistorted regions in the AE image as the reference image and at least one of the SE image and the LE image. In an embodiment, the method allows the alignment controller 111 to detect the feature-points in the undistorted regions in the AE image as the reference image and at least one of the SE image and the LE image.

In operation S1104, the method includes determining the pairwise matches in the undistorted region based on the detected feature-points. In an embodiment of the disclosure, the method allows the alignment controller 111 to determine the pairwise matches in the undistorted region based on the detected feature-points in the source image and the reference image. In operation S1106, the method includes estimating the motion information based on the pairwise matches. In an embodiment of the disclosure, the method allows the alignment controller 111 to estimate the motion information based on the pairwise matches.

In operation S1108, the method includes estimating the motion model for the source image based on the motion information. In an embodiment of the disclosure, the method allows the alignment controller 111 to estimate the motion model based on the motion information.

The various actions, acts, blocks, operations, or the like in the flow diagram of S1100 may be performed in the order presented, in a different order or simultaneously. Further, in some embodiments, some of the actions, acts, blocks, operations, or the like may be omitted, added, modified, skipped, or the like without departing from the scope of the disclosure.

Figure 12:
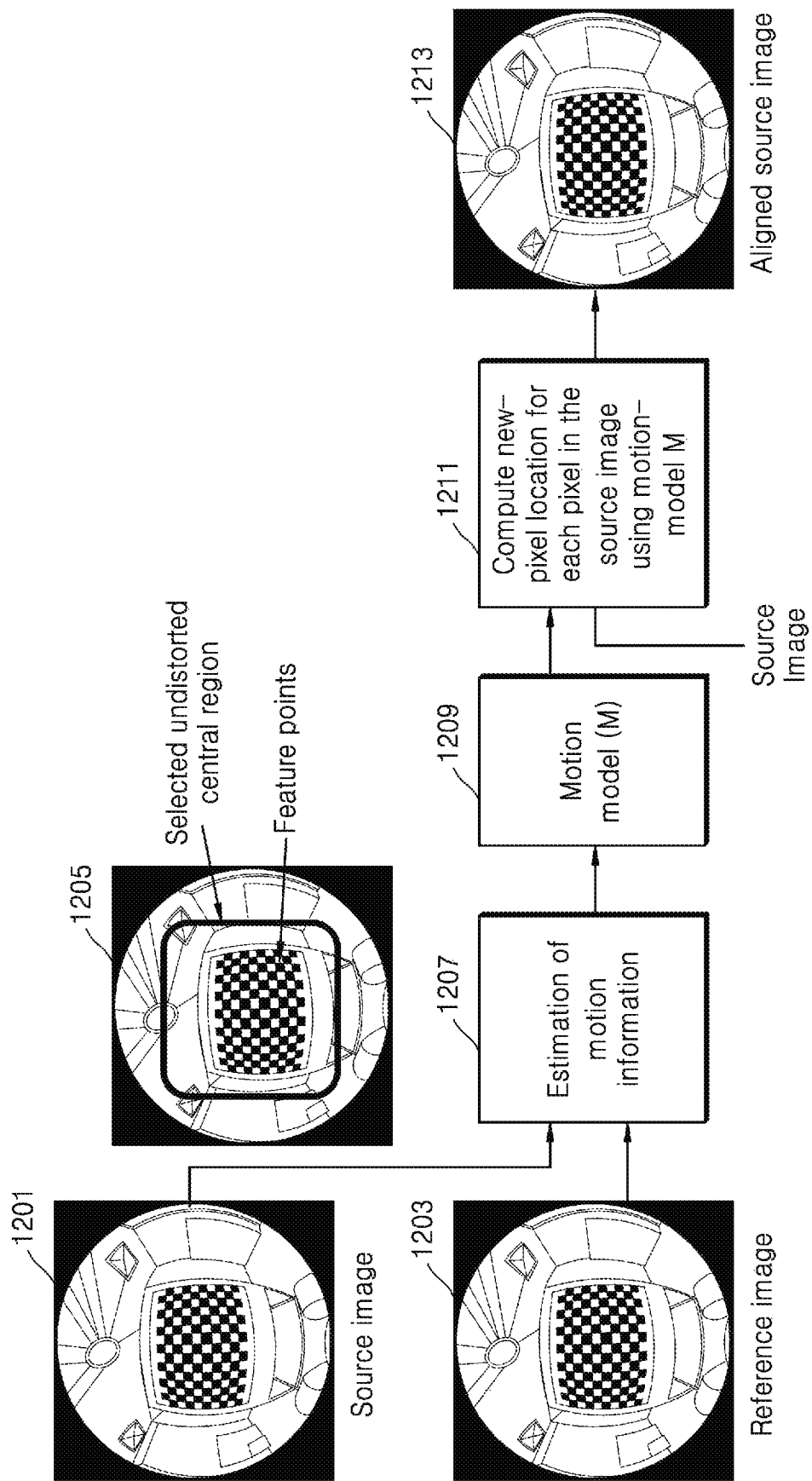
FIG. 12 is an example illustration in which various operations are explained for aligning a source image with respect to a reference image according to an embodiment of the disclosure.

FIG. 12 is an example illustration in which various operations are explained for aligning a source image with respect to a reference image according to an embodiment of the disclosure.

Referring to FIG. 12, the source image includes the LE image and the SE image of the scene. Further, the reference image includes the AE image of the same scene. In operations 1201 and 1203, the source image and the reference image are selected to estimate the motion information of the feature points in the source image.

The impact of distortion is unaffected at a central region of the images, while moving away from the central region of the images, and, the impact of distortion is gradually increased and maximum at the edge part of the images.

In operation 1205, the undistorted central region is selected from the source image and the reference image. Further, the feature points in the selected region of the source image and the reference image are detected.

In operation 1207, the motion information is estimated by performing the pairwise match of the motion vectors of the feature points in the source image with respect to the corresponding motion vectors of feature points in the reference image. In operation 1209, the motion model for the source image is generated using the estimated motion information. In an embodiment of the disclosure, the motion information of each feature point in the LE image and SE image are estimated by matching a motion vectors of the feature points in the LE image and the SE image with the corresponding motion vectors of the feature points in the AE image.

In operation 1211, the motion model is applied on the source image to compute the new pixel location of each pixel in the source image. Based on the motion-model, each pixel location is shifted to a new pixel location in the fisheye view. The new pixel location is computed using a translational model. Further, the new pixel location is computed considering spherical projection aspects and is approximated using a taylor series expansion for fast and simpler calculation.

In operation 1213, the source image is aligned based on the motion model.

Figure 13:
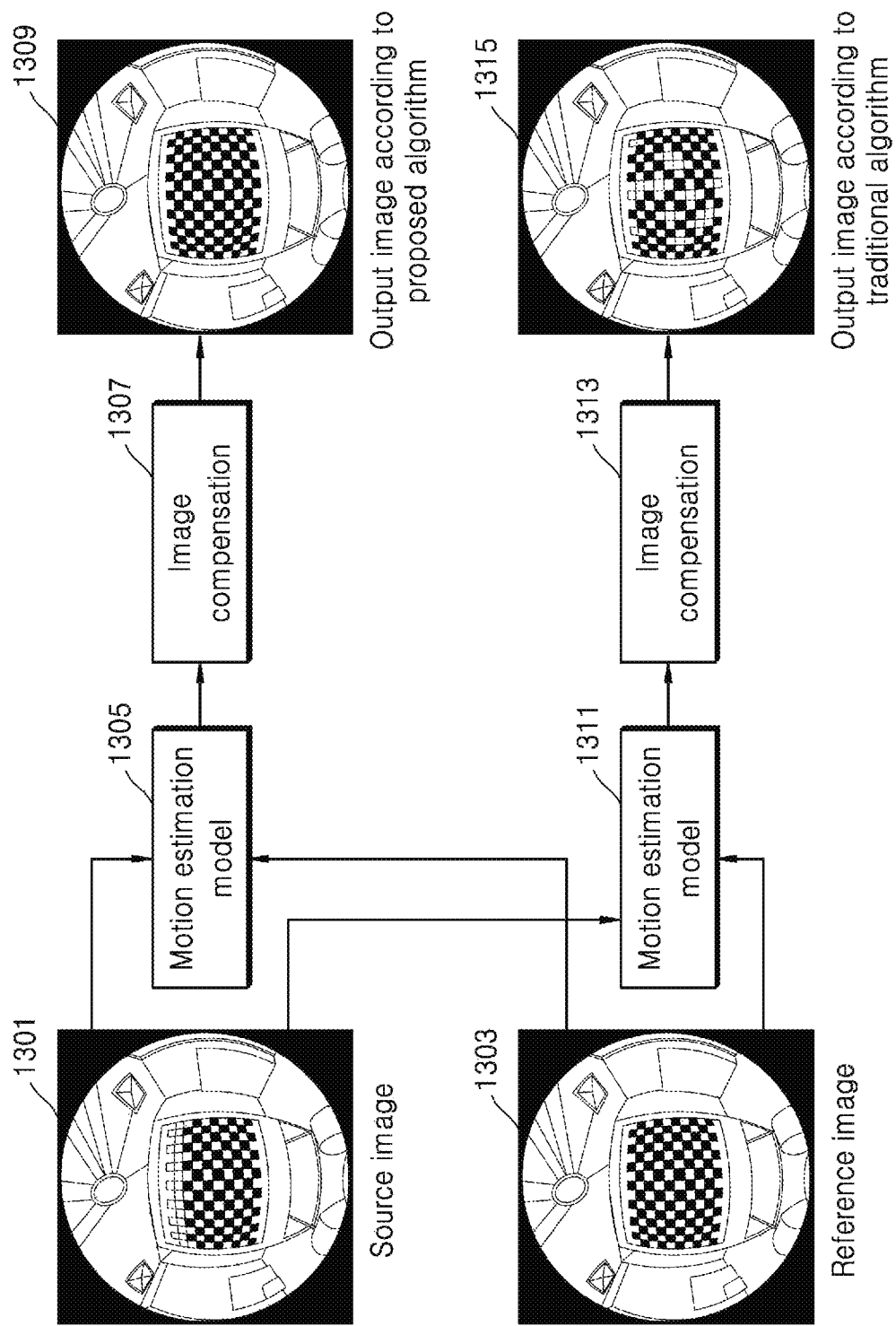
FIG. 13 illustrates a comparison of images output from two types of image-alignment pipelines according to an embodiment of the disclosure.

FIG. 13 illustrates a comparison of images output from two types of image-alignment pipelines according to an embodiment of the disclosure.

Referring to FIG. 13, the output image 1309 from the proposed method is formed in consideration of radial distortions and the spherical projection aspects for the motion estimation of a motion estimation model 1305 and image compensation 1307 during aligning the source image 1301 with reference to the reference image 1303.

The output image 1315 in the traditional method is formed by considering pin-hole camera projection aspects for the motion estimation model 1311 and the image compensation 1313 during aligning the source image. Further, the traditional method does not consider the radial distortions and the spherical projection aspects for the motion estimation and compensation during aligning the source image with reference to the reference image.

Figure 14:
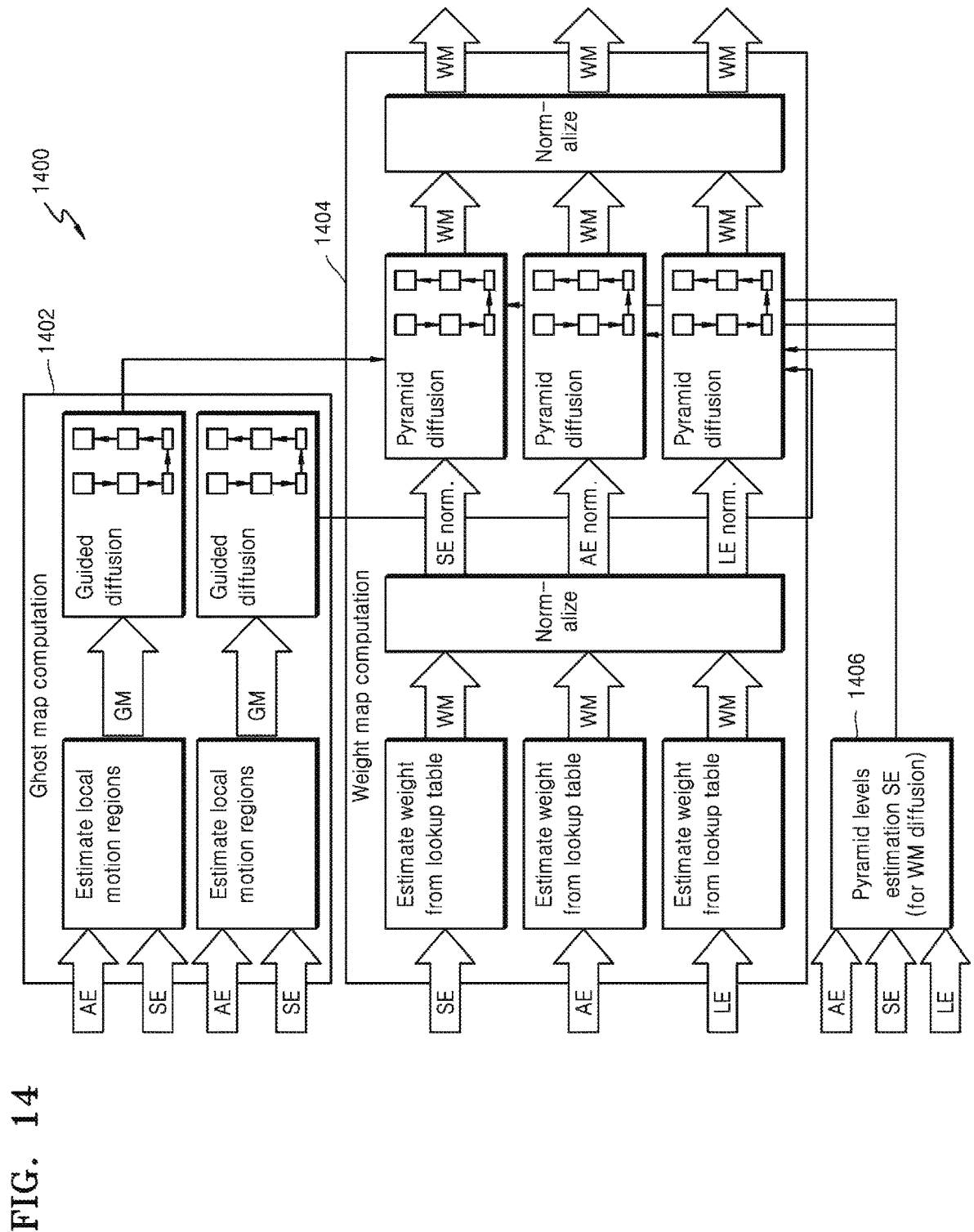
FIG. 14 is a flow diagram illustrating a method for generating the modified pixel weight coefficient for a long-exposure (LE) image, an auto-exposure (AE) image, and a short-exposure (SE) image according to an embodiment of the disclosure.

FIG. 14 is a flow diagram illustrating a method for generating a modified pixel weight coefficient for an LE image, an AE image, and an SE image according to an embodiment of the disclosure.

Referring to FIG. 14, a flow diagram 1400 is illustrated for determining the modified pixel weight coefficients. In operation 1402, Ghost-Map Computation is provided to estimate local motion regions between the AE-LE pair and the AE-SE pair and generate a ghost-map for each pair respectively. The generated ghost-map is further diffused using a guided filter. This output is fed to a pyramid diffusion module in a weight map computation module.

In operation 1404, weight-map computation is provided. The computation of weight map for each image is done so as to bring the best exposed regions of each of the images in the HDR output. The weight maps are generated in a way that the HDR fused image should not contain over-saturated and under-saturated pixels. The regions which are over-exposed are better captured in the SE image, regions which are under-exposed are better captured in the LE image and the regions which are near mid intensity value are best captured in the AE image. The weight maps are estimated using a LUT and then normalized.

These normalized weight-maps are diffused smoothly to remove any artifacts which can occur because of discontinuous fusion weights in the composite image. In addition, it is required to blend or mix the information from the ghost map in the SE and LE weight maps. The weight maps for each of the images (i.e., LE and SE) are modified based on the gradient difference maps obtained in the calculation of ghost map as follows:

1. If in a region there is a local motion between only AE and LE, then the weights of LE are suppressed in that region, 2. In a region where there is a local motion between only AE and SE, then the weights of SE are suppressed in that region, and 3. If both LE and SE images have local motion with respect to AE then the weights of both LE and SE are suppressed in that region.

In this way, the weight maps of LE and SE are modified based on the local motion detection. The resulting weight maps are again normalized and further used for weighted composition of the HDR image.

In operation 1406, pyramid level estimation is provided. Based on the input images, a number of pyramid levels are estimated based on the input resolution and is fed to a pyramid diffusion module in the weight map computation module.

Figure 15:
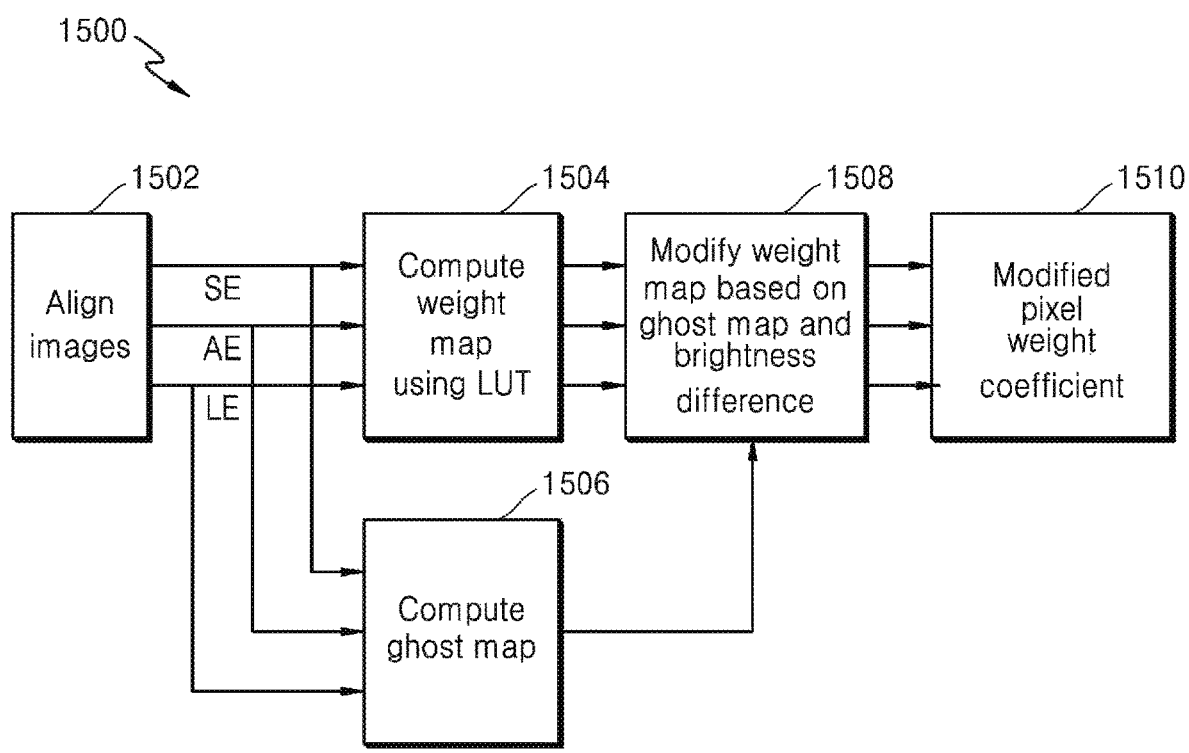
FIG. 15 is a flow diagram illustrating a method for generating a modified pixel weight coefficient for an LE image, an AE image, and an SE image according to an embodiment of the disclosure.

FIG. 15 is a flow diagram illustrating a method for generating a modified pixel weight coefficient for an LE image, an AE image, and an SE image according to an embodiment of the disclosure.

Referring to FIG. 15, a flow diagram 1500 illustrates determining modified pixel weight coefficients. In operation 1502, the AE image and the aligned LE and SE images, are transferred from the alignment controller 111 to weight-map generator 112. In operation 1504, the pixel weight coefficient is computed for each of the LE image, the AE image and the SE image using the LUT by the weight-map generator 112. In operation 1506, the ghost map is computed for the LE image, the AE image and the SE image images in the weight-map generator 112. In operation 1508, the computed pixel weight coefficient of each of the LE image, the AE image and the SE image are modified based on the computed ghost map distribution for corresponding images. In operation 1510, the weight-map generator 112 outputs the LE image, the AE image and the SE image images having modified pixel weight coefficient.

The various actions, acts, blocks, operations, or the like in the flow diagram of 1500 may be performed in the order presented, in a different order or simultaneously. Further, in some embodiments, some of the actions, acts, blocks, operations, or the like may be omitted, added, modified, skipped, or the like without departing from the scope of the disclosure.

Figure 16:
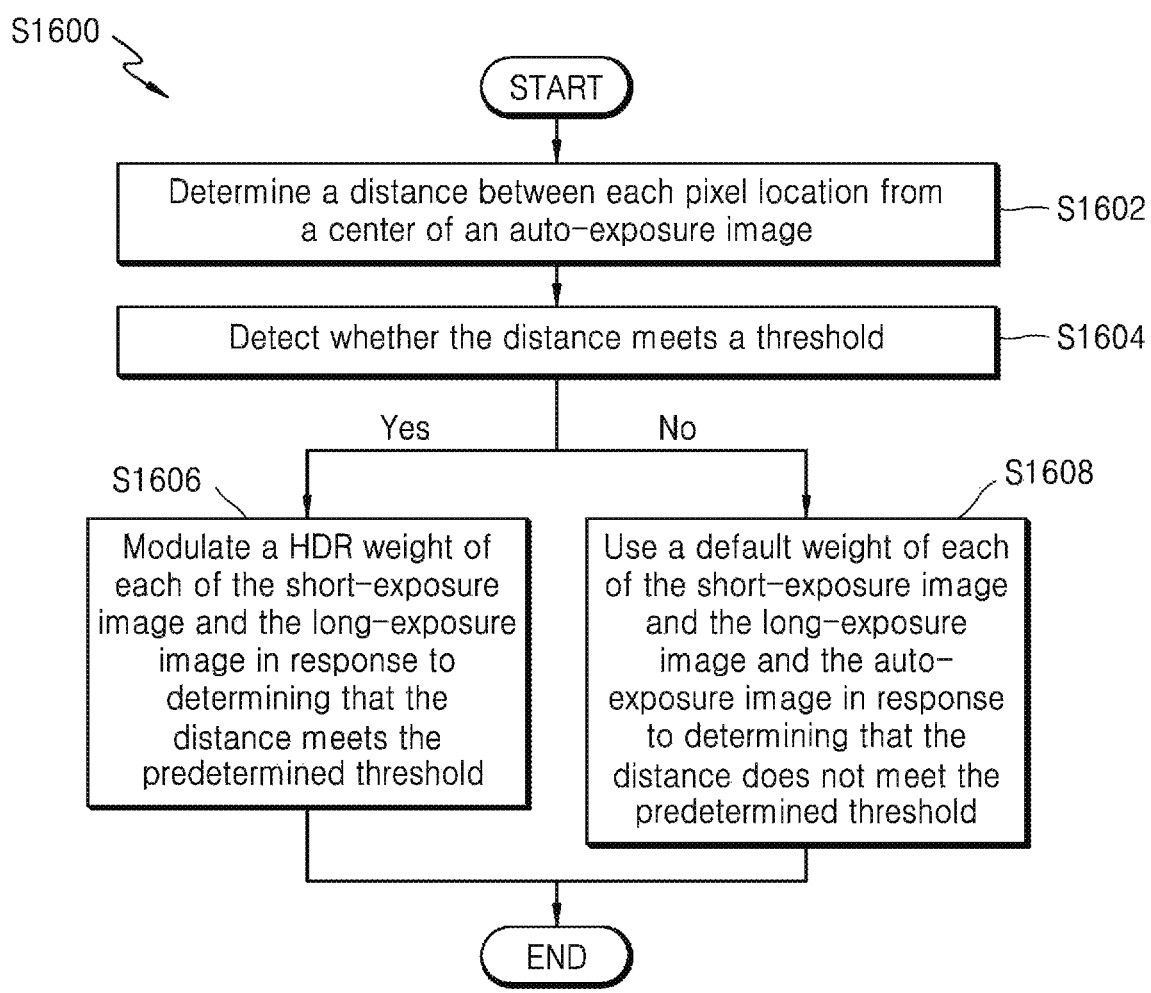
FIG. 16 is the flow diagram illustrating a method for correcting brightness at an overlapping region in an HDR image according to an embodiment of the disclosure.

FIG. 16 is the flow diagram illustrating a method for correcting brightness at an overlapping region in an HDR image according to an embodiment of the disclosure.

Referring to FIG. 16, a flow diagram 1500 illustrates that the LE image, the AE image and the SE image have the modified pixel weight coefficient and are transferred to the brightness correction controller 113 in the imaging device 100. In operation S1602, the method includes determining a distance between each pixel location from the center of the AE image. In an embodiment of the disclosure, the method allows brightness correction controller 113 to determine the distance between each pixel location from the center of the AE image.

In operation S1604, the method includes detecting whether the distance meets a predetermined threshold. In an embodiment of the disclosure, the method allows brightness correction controller 113 to determine whether the distance meets the threshold. In operation S1606, the method includes modulating the HDR weight of each of the SE image and the LE image in response to determining that the distance meets the threshold. In an embodiment of the disclosure, the method allows brightness correction controller 113 to modulate the HDR weight of each of the SE image and the LE image in response to a determination that the distance meets the predetermined threshold.

In operation S1608, the method includes using the default weight of each of the SE image and the LE image and the AE image in response to a determination that the distance does not meet the predetermined threshold. In an embodiment, the method allows brightness correction controller 113 to use the default weight of each of the SE image and the LE image and the AE image in response to determining that the distance does not meets the threshold.

The various actions, acts, blocks, operations, or the like in the flow diagram of S1600 may be performed in the order presented, in a different order or simultaneously. Further, in some embodiments, some of the actions, acts, blocks, operations, or the like may be omitted, added, modified, skipped, or the like without departing from the scope of the disclosure.

Figure 17A:
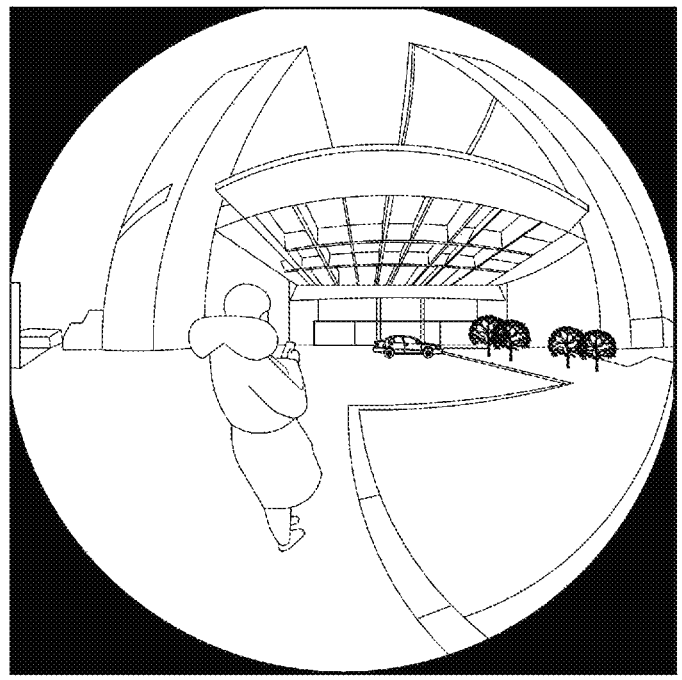
FIGS. 17A and 17B illustrate a comparison of brightness correction in an image due to modulated weights and normal weights according to an embodiment of the disclosure.
Figure 17B:
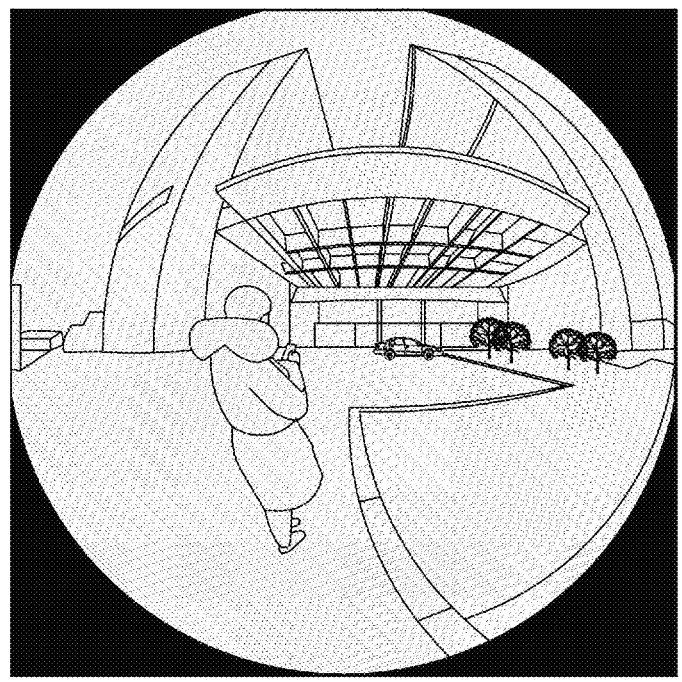

FIGS. 17A and 17B illustrate a comparison of brightness correction in an image due to modulated weights and normal weights according to an embodiment of the disclosure.

Referring to FIG. 17A, the image having pixel weight coefficient with normal/default weight is shown. The pixel weight coefficient is reduced after a modulation at a corresponding pixel position. Referring to FIG. 17B, the pixel weight coefficient of the same image is modulated at the overlapping region. The brightness of the image in the overlapping region is reduced in FIG. 17B as compared to FIG. 17A.

Figure 18A:
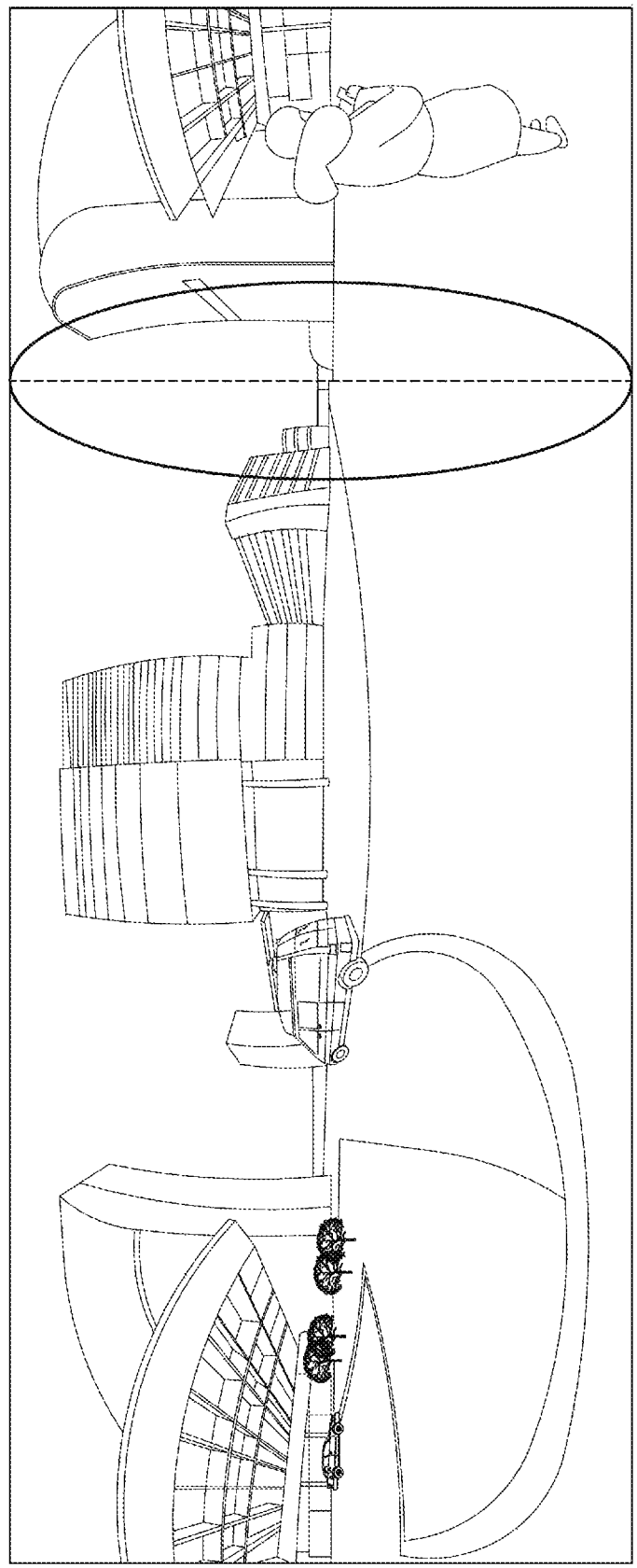
FIGS. 18A and 18B illustrate a comparison of brightness differences in a stitched image according to an embodiment of the disclosure.
Figure 18B:
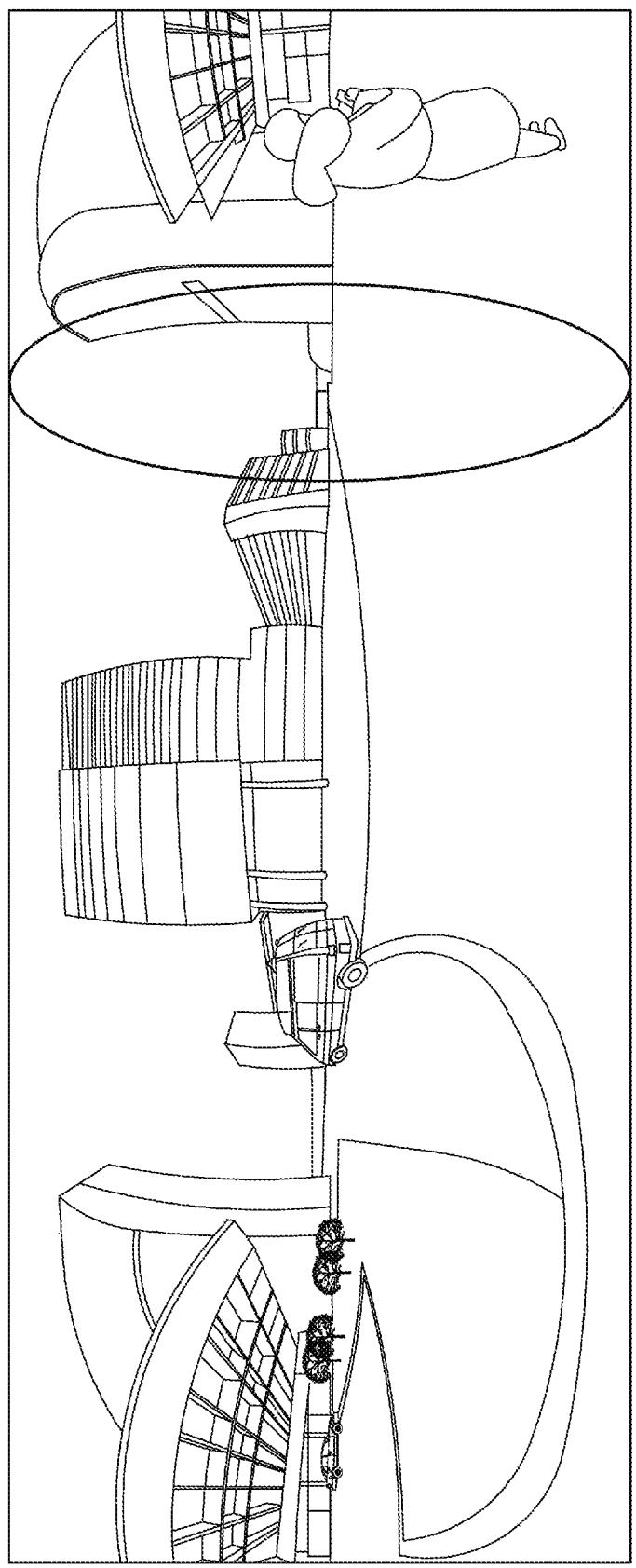

FIGS. 18A and 18B illustrate a comparison of brightness differences in a stitched image according to an embodiment of the disclosure.

Referring to FIG. 18A, the stitched rectilinear HDR image without brightness correction is shown. The marked region in the image is one of the stitched region. Due to the brightness mismatch, the visible line is formed at the stitched region in the image. Referring to FIG. 18B, the stitched rectilinear HDR image with the brightness correction is shown. The visible line seen in FIG. 18A is absent in the corresponding marked region in FIG. 18B. The weights for the pixel weight coefficient in the overlapping region of two HDR images (front and rear) are modulated before stitching.

Figure 19:
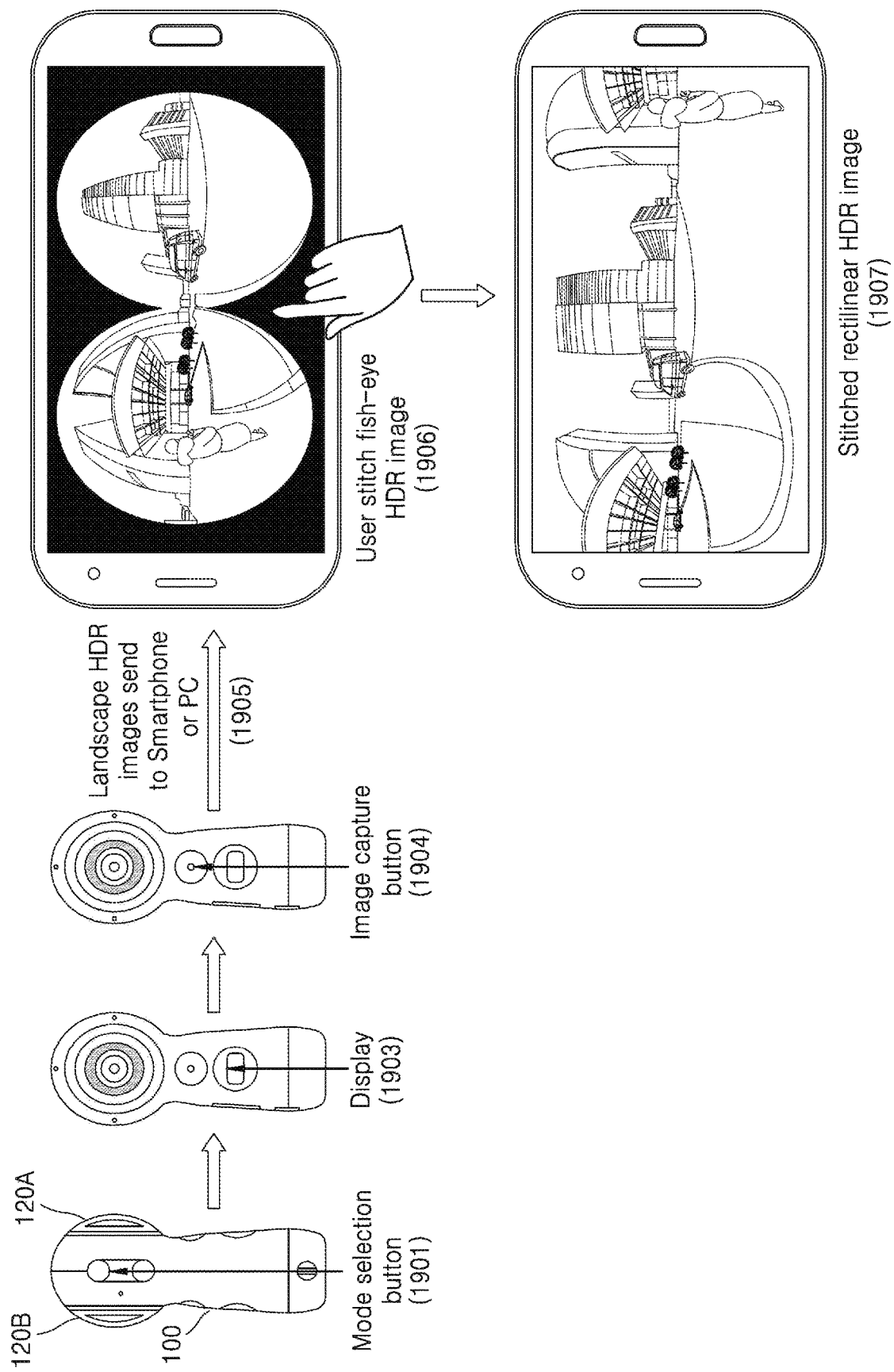
FIG. 19 illustrates an example scenario of generating a 360-degree landscape HDR image using an imaging device according to an embodiment of the disclosure.

FIG. 19 illustrates an example scenario of generating a 360-degree landscape HDR image using an imaging device according to an embodiment of the disclosure.

Referring to FIG. 19, the imaging device 100 includes two sensors comprising front sensor 120A and rear sensor 120B, which are located each at a front side and a rear side of the imaging device 100.

In an embodiment of the disclosure, a front sensor 120A and a rear sensor 120B capture the HDR image in a fisheye domain.

Further the imaging device 100 includes a display, a pair of mode selection button and an image capturing button. In operation 1901, the user may select the landscape HDR capturing mode in the imaging device 100 by pressing the mode selection button to select the landscape HDR capturing mode. Further, the user may select the dual lens mode by pressing the mode selection button, to enable both of the front sensor 120A and the rear sensor 120B to capture the front and the rear image together. In operation 1903, the user can view the selection mode in the display of the imaging device 100. In operation 1904, the user can initiate the image capturing by pressing the image capture button.

Further, the imaging device 100 may captures the HDR image upon pressing the image capturing button.

In operation 1905, the imaging device 100 transmits the HDR images to the electronic device 200 (e.g., smartphone, personal computer etc.). In operation 1906, the user can select the received HDR images to stitch the front HDR image and the rear HDR image. In operation 1907, the selected images are used to generate the stitched rectilinear HDR image. The received HDR images are converted to rectilinear form before performing stitching.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An imaging device comprising:
   at least one sensor configured to capture a long-exposure (LE) image, a short-exposure (SE) image, and an auto-exposure (AE) image of a scene;
   a memory; and
   at least one processor configured to:
      estimate motion information in the SE image and the LE image based on a reference image,
      align the SE image and the LE image using the motion information,
      generate at least one pixel-weight coefficient using at least one of the SE image, the LE image, or the AE image,
      generate an overlapped region mask corresponding to an overlapped region in each of the SE image, the LE image, and the AE image,
      determine a modified pixel-weight coefficient in the overlapped region mask,
      correct a brightness difference in the overlapped region mask,
      generate a high-dynamic-range (HDR) image from the SE image, the LE image, and the AE image using the modified pixel-weight coefficient, and
      store the HDR image in the memory.

2. The imaging device of claim 1, wherein the generating of the HDR image comprises fusing the SE image, the LE image, and the AE image using the modified pixel-weight coefficient.

3. The imaging device of claim 2, wherein, to correct the brightness difference, the at least one processor is further configured to:
   determine a distance between each pixel location from a center of the AE image,
   determine whether the distance meets a predetermined threshold,
   in response to determining that the distance meets the predetermined threshold modulate an HDR weight of each of the SE image and the LE image, and
   in response to determining that the distance does not meet the predetermined threshold, use a default weight of each of the SE image, the LE image, and the AE image.

4. The imaging device of claim 3, wherein the HDR weight of each of the SE image and the LE image is modulated by suppressing weights of the LE image and the SE image and enhancing weights of the AE image based on at least one of a distance from the center of the AE image or a pixel difference between a front view and a rear view.

5. The imaging device of claim 1, wherein the motion information comprises at least one of a translation or a rotation of the imaging device in undistorted regions of the AE image and at least one of the SE image or the LE image.

6. The imaging device of claim 1, wherein, in response to the at least one processor estimating the motion information, the at least one processor is further configured to:
   detect feature-points in undistorted regions of the reference image and at least one of the SE image or the LE image,
   determine pairwise matches in the undistorted regions based on the feature-points, and
   estimate the motion information based on the pairwise matches.

7. The imaging device of claim 1, wherein the capturing of the LE image, the SE image, and the AE image is performed in an HDR mode.

8. The imaging device of claim 1, wherein the HDR image includes a 360-degree wide image.

9. A method of an imaging device, the method comprising:
   capturing a long-exposure (LE) image, a short-exposure (SE) image, and an auto-exposure (AE) image of a scene;
   estimating motion information in the SE image and the LE image based on a reference image which is determined based on an image statistics parameter;
   aligning the SE image and the LE image using the motion information;
   generating a pixel-weight coefficient for each of the SE image, the LE image, and the AE image;
   generating an overlapped region mask corresponding to an overlapped region in each of the SE image, the LE image, and the AE image;
   determining a modified pixel-weight coefficient in the overlapped region mask;
   correcting a brightness difference; and
   generating a high-dynamic-range (HDR) image from the SE image, the LE image, and the AE image using the modified pixel-weight coefficient.

10. The method of claim 9, wherein the estimating of the motion information comprises:

detecting feature-points in undistorted regions of the reference image and at least one of the SE image or the LE image;
determining pairwise matches in the undistorted regions based on the detected feature-points; and
estimating the motion information based on the pairwise matches.

* * * * *